(12) United States Patent
Mioka et al.

(10) Patent No.: US 10,435,108 B2
(45) Date of Patent: Oct. 8, 2019

(54) INFORMATION OUTPUT DEVICE

(71) Applicant: PIONEER CORPORATION, Tokyo (JP)

(72) Inventors: Nobuo Mioka, Saitama (JP); Yasuteru Kodama, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 15/759,757

(22) PCT Filed: Sep. 17, 2015

(86) PCT No.: PCT/JP2015/076399
§ 371 (c)(1),
(2) Date: Mar. 13, 2018

(87) PCT Pub. No.: WO2017/046907
PCT Pub. Date: Mar. 23, 2017

(65) Prior Publication Data
US 2018/0178879 A1    Jun. 28, 2018

(51) Int. Cl.
*G01L 1/00* (2006.01)
*B62M 3/08* (2006.01)
(Continued)

(52) U.S. Cl.
CPC ............... *B62M 3/08* (2013.01); *B62J 99/00* (2013.01); *B62M 3/00* (2013.01); *G01L 1/22* (2013.01);
(Continued)

(58) Field of Classification Search
CPC ... B62M 3/08; B62M 3/00; B62J 99/00; B62J 2099/0013; B62J 2099/002; B62J 2099/0026; B62J 2099/0033; B62J 2099/004; G01L 1/22; G01L 1/2206; G01L 1/2262; G01L 3/247
(Continued)

(56) References Cited

U.S. PATENT DOCUMENTS 5,816,599 A * 10/1998 Soejima ................... B62M 1/36
                                                280/259
6,047,230 A *  4/2000 Spencer ................. B62M 9/123
                                                 474/70
(Continued)

FOREIGN PATENT DOCUMENTS

JP    H10-035567 A    2/1998
JP    2009-6991 A     1/2009

OTHER PUBLICATIONS

International Search Report and Written Opinion for PCT App No. PCT/JP2015/076399 dated Dec. 15, 2015, 6 pgs.

*Primary Examiner* — Max H Noori
(74) *Attorney, Agent, or Firm* — Procopio, Cory, Hargreaves & Savitch LLP

(57) ABSTRACT

An information output device that can output the position of a load applied to the pedal is provided. A strain gauge is provided on the inner face of a crank of a bicycle and detects strain occurring in the crank. A cycle computer display unit displays an image showing the center position of the load applied to the pedal connected to the crank based on the tangential force and the torsional torque calculated based on the output values of the first strain gauge to the sixth strain gauge.

19 Claims, 11 Drawing Sheets

(51) Int. Cl.
*B62M 3/00* (2006.01)
*B62J 99/00* (2009.01)
*G01L 1/22* (2006.01)
*G01L 3/24* (2006.01)

(52) U.S. Cl.
CPC .......... *G01L 1/2206* (2013.01); *G01L 1/2262* (2013.01); *G01L 3/247* (2013.01); *B62J 2099/002* (2013.01); *B62J 2099/004* (2013.01); *B62J 2099/0013* (2013.01); *B62J 2099/0026* (2013.01); *B62J 2099/0033* (2013.01)

(58) Field of Classification Search
USPC ...................................... 73/862.25
See application file for complete search history.

(56) References Cited

U.S. PATENT DOCUMENTS

| | | | |
|---|---|---|---|
| 9,528,892 B2* | 12/2016 | Kodama | G01L 5/161 |
| 2008/0236293 A1 | 10/2008 | Meggiolan | |
| 2010/0263468 A1* | 10/2010 | Fisher | B62M 3/00 |
| | | | 74/469 |
| 2011/0251022 A1* | 10/2011 | Lee | A63B 23/03541 |
| | | | 482/8 |
| 2013/0205916 A1* | 8/2013 | Kodama | A63B 24/0062 |
| | | | 73/862.69 |
| 2014/0256512 A1* | 9/2014 | Kaiser | A63B 22/0694 |
| | | | 482/9 |

\* cited by examiner

INFORMATION OUTPUT DEVICE

CROSS-REFERENCE TO RELATED APPLICATIONS

This application is a U.S. National Stage entry of PCT Application No. PCT/JP2015/076399, filed on Sep. 17, 2015, the contents of which are incorporated herein by reference.

TECHNICAL FIELD

The present invention relates to an information output device for outputting information on a force and the like applied to a human-powered machine including a crank.

BACKGROUND ART

Conventionally, there has been a device attached to a bicycle, for calculating information on the running of the bicycle, information on the movement of the cyclist, and the like to display. This type of device calculates predetermined information by receiving data from a sensor provided on the bicycle to display. The information to be displayed includes the force applied to the pedal by the cyclist (torque, and the like). Further, as a method for measuring this type of force, for example, Patent Literature 1 discloses a technique of measuring the strain on the crankshaft to detect the torque applied to the crank.

Furthermore, Patent Literature 2 discloses a technique of embedding a piezoelectric sensor in a crank to measure torque by using a voltage generated by the strain on the crank.

In addition, Patent Literature 1 describes that this technique can also be applied to a stationary bicycle-type health machine (also referred to as a bicycle ergometer or a fitness bike).

Thus, it is already known that in a human-powered machine including a crank, torque is measured by the detection of a strain applied to a crank and the momentum or the like is calculated.

CITATION LIST

Patent Literature

Patent Literature 1: JP H10-35567 A
Patent Literature 2: JP 2009-6991 A

SUMMARY OF INVENTION

Technical Problem

In the above-described patent Literature, it is disclosed that a force or the like applied to a crank is displayed with a numerical value or the like. However, it is known that these forces vary depending on the riding posture (form) on the human-powered machine. For example, if the position of the load applied to the pedal connected to the crank is not appropriate, a burden is placed on the body, and efficient pedaling cannot be performed.

Therefore, in view of the above-described problems, it is an object of the present invention to provide an information output device capable of outputting, for example, the position of a load applied to a pedal.

Solution to Problem

In order to solve the above-described problem, the present invention is an information output device including: a strain detection unit provided on a side face of a crank of a human-powered machine and configured to detect a strain occurring in the crank; and an output unit configured to output information on a center position of a load applied to a pedal connected to the crank based on a force acting in a tangential direction of a circle defined by rotational motion of the crank and torque acting in a direction causing torsion in the crank, the force and the torque calculated based on an output value of the strain detection unit.

Further, the present invention is an information output method executed by an information output device including a strain detection unit provided on a side face of a crank of a human-powered machine and configured to detect a strain occurring in the crank. The information output method includes: a calculation step of calculating a force acting in a tangential direction of a circle defined by rotational motion of the crank and torque acting in a direction causing torsion in the crank based on an output value of the strain detection unit; and an output step of outputting information on a center position of a load applied to a pedal connected to the crank based on a force acting in the tangential direction of the circle defined by rotational motion of the crank and torque acting in the direction causing torsion in the crank, the force and the torque calculated in the calculating step.

Further, the present invention is an information output program allowing a computer to execute the above information output method.

Furthermore, the present invention is a computer-readable recording medium storing the above information output program.

DESCRIPTION OF EMBODIMENTS

Figure 1:
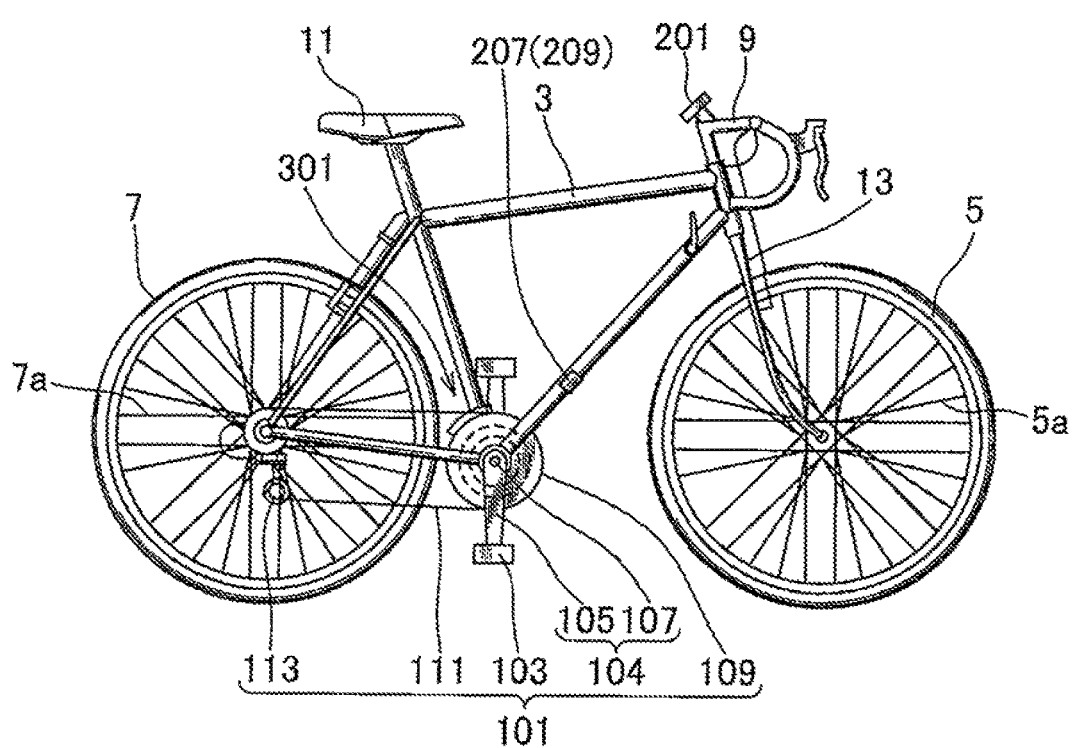
FIG. 1 is an explanatory diagram showing the overall configuration of a bicycle on which an information output device according to a first embodiment of the present invention is installed.

Hereinafter, an information output device according to an embodiment of the present invention will be described. In the information output device according to an embodiment of the present invention, a strain detection unit is provided on a side face of a crank of the human-powered machine and detects the strain occurring in the crank, and an output unit outputs information on the center position of the load applied to the pedal connected to the crank based on the force acting in the tangential direction of the circle defined by the rotational motion of the crank and the torque acting in a direction causing torsion in the crank calculated based on the output value of the strain detection unit. This allows information on the center position of the load applied to the pedal to be calculated from the detection result of the strain detection unit provided in the crank to be output. Therefore, efficient pedaling or the like can be performed based on this information.

Further, the strain detection unit may be provided on a side face of each of the cranks which the human-powered machine includes on the left and right sides in a pair. The output unit may output information on a center position of the load applied to the pedal connected to each of the left and right cranks in such a manner as to display side by side. This allows the user and the like to compare and check the left and right pedaling balance and the like, and therefore this can help improve pedaling forms and the like.

In addition, the output unit may output the center position of the load applied to the pedal detected by the strain detection unit and the center position of the load set in advance as a reference in a comparable manner. This allows, for example, the user and the like to compare the center of the load in their own pedaling with the center of the load in the appropriate pedaling, and therefore this can help improve pedaling forms and the like.

Furthermore, the strain detection unit includes a plurality of strain gauge parts including a first strain gauge part for detecting a strain deforming in the tangential direction occurring in the crank, and a second strain gauge part for detecting a strain deforming in the torsional direction of the crank occurring in the crank. Then, the plurality of strain gauge parts may output voltage values depending on the deformation amount of the crank in a direction in which each strain gauge part detects a strain. This allows the force acting in the tangential direction of the circle defined by the rotational motion of the crank and the torque acting in the direction causing torsion in the crank to be calculated with the output voltage values of the plurality of strain gauge parts.

In addition, the force acting in a tangential direction of a circle defined by the rotational motion of the crank and the torque acting in a direction causing torsion in the crank may be calculated by substituting voltage values output by the plurality of strain gauge parts into a predetermined polynomial. This allows the force and the torque to be calculated by the calculation using, for example, a CPU or the like.

In addition, the coefficient of each term of the predetermined polynomial may be set in advance based on the first reference torsional torque applied to the crank in the first state where a predetermined load is applied to the position on the pedal apart from the central axis of the crank by the first distance, the second reference torsional torque applied to the crank in the second state where a predetermined load is applied to the position on the pedal apart from the central axis of the crank by the second distance different from the first distance, and the voltage values output by the plurality of strain gauge parts in each of the first state and the second state. This allows the coefficients to be calculated in advance based on the first reference torsional torque, the second reference torsional torque, and the output voltage values of the strain gauge parts at the time of calculating the first reference torsional torque and the second reference torsional torque, which can be calculated with known numerical values. Therefore, only substituting the values measured in the strain gauge parts into the polynomial allows the force acting in the tangential direction of the circle defined by the rotational motion of the crank and the torque acting in the direction causing torsion in the crank to be calculated. In addition, since the coefficients can be changed according to the crank, the force acting in the tangential direction of the circle defined by the rotational motion of the crank and the torque acting in the direction causing the torsion in the crank can be accurately calculated depending on the crank.

In addition, an information output method according to an embodiment of the present invention includes: a calculation step of calculating the force acting in a tangential direction of a circle defined by the rotational motion of the crank and the torque acting in a direction causing torsion in the crank based on the output value of the strain detection unit, and an output step of outputting information on the center position of the load applied to the pedal connected to the crank based on the force acting in the tangential direction of the circle defined by the rotational motion of the crank and the torque acting in the direction causing torsion in the crank calculated in the calculation step. This allows information on the center position of the load applied to the pedal to be calculated from the detection result of the strain detection unit provided in the crank to be output, and therefore, efficient pedaling or the like may be performed based on this information.

In addition, the information output program according to an embodiment of the present invention causes a computer to execute the above-described information output method. This allows information on the center position of the load applied to the pedal to be calculated from the detection result of the strain detection unit provided in the crank to be output by using a computer, and therefore, efficient pedaling or the like may be performed based on this information.

In addition, the information output program described above may be stored in a computer-readable recording medium. This allows the program to be distributed also as a single item besides being incorporated in equipment, and allows also the upgrade or the like to be made easily.

First Embodiment

A bicycle 1 including a cycle computer 201 and a measurement module 301 as an information output device according to a first embodiment of the present invention will be described with reference to FIGS. 1 to 9B. As shown in FIG. 1, the bicycle 1 includes a frame 3, a front wheel 5, a rear wheel 7, handlebars 9, a saddle 11, a front fork 13, and a drive mechanism 101.

The frame 3 includes two truss structures. The frame 3 is rotatably connected to the rear wheel 7 at the rear tip portion. In addition, in the frame 3, in front of the frame 3, the front fork 13 is rotatably connected.

The front fork 13 is connected to the handlebars 9. At the tip position in the downward direction of the front fork 13, the front fork 13 and the front wheel 5 are rotatably connected to each other.

The front wheel 5 includes a hub portion, a spoke portion, and a tire portion. The hub portion is rotatably connected to the front fork 13. Then, the hub portion and the tire portion are connected to each other by the spoke portion.

The rear wheel 7 includes a hub portion, a spoke portion, and a tire portion. The hub portion is rotatably connected to the frame 3. Then, the hub portion and the tire portion are connected to each other by the spoke portion. The hub portion of the rear wheel 7 is connected to a sprocket 113 described below.

The bicycle 1 includes a drive mechanism 101 for converting a stepping force by a foot of a user (cyclist) into a drive force of the bicycle 1. The drive mechanism 101 includes a pedal 103, a crank mechanism 104, a chain ring 109, a chain 111, and a sprocket 113.

The pedal 103 is a portion for the user to step on, the portion coming into contact with the user's foot. The pedal 103 is supported by a pedal crankshaft 115 of the crank mechanism 104 in such a manner as to be rotatable.

The crank mechanism 104 includes a crank 105, a crankshaft 107, and a pedal crankshaft 115 (see FIGS. 2 and 6A to 6C).

The crankshaft 107 penetrates the frame 3 in the lateral direction (from one side to the other side on the side face of the bicycle). The crankshaft 107 is rotatably supported by the frame 3.

The crank 105 is provided at right angles to the crankshaft 107. The crank 105 is connected to the crankshaft 107 at one end.

The pedal crankshaft 115 is provided at right angles to the crank 105. The axial direction of the pedal crankshaft 115 is in the same direction as that of the crankshaft 107. The pedal crankshaft 115 is connected to the crank 105 at the other end of the crank 105.

The crank mechanism 104 also includes this structure on the opposite side of the side face of the bicycle 1. That is, the crank mechanism 104 includes two cranks 105 and two pedal crankshafts 115. Therefore, the pedal 103 is also provided on each side of the bicycle 1.

When these are distinguished whether on the right side or on the left side of the bicycle 1, each of them is described as a right side crank 105R, a left side crank 105L, a right side pedal crankshaft 115R, a left side pedal crankshaft 115L, a right side pedal 103R, and a left side pedal 103L.

In addition, the right side crank 105R and the left side crank 105L are connected to each other in such a manner as to extend in the opposite direction centered around the crankshaft 107. The right side pedal crankshaft 115R, the crankshaft 107, and the left side pedal crankshaft 115L are formed in parallel and on the same plane. The right side crank 105R and the left side crank 105L are formed in parallel and on the same plane.

The chain ring 109 is connected to the crankshaft 107. The chain ring 109 is suitably constituted by a variable gear capable of changing the gear ratio. In addition, the chain 111 is engaged with the chain ring 109.

The chain 111 is engaged with the chain ring 109 and the sprocket 113. The sprocket 113 is connected to the rear wheel 7. The sprocket 113 suitably includes a variable gear.

The bicycle 1 converts the stepping force of the user into the rotation force of the rear wheel with this drive mechanism 101.

The bicycle 1 includes a cycle computer 201, a measurement module 301, and a cadence sensor 501.

Figure 2:
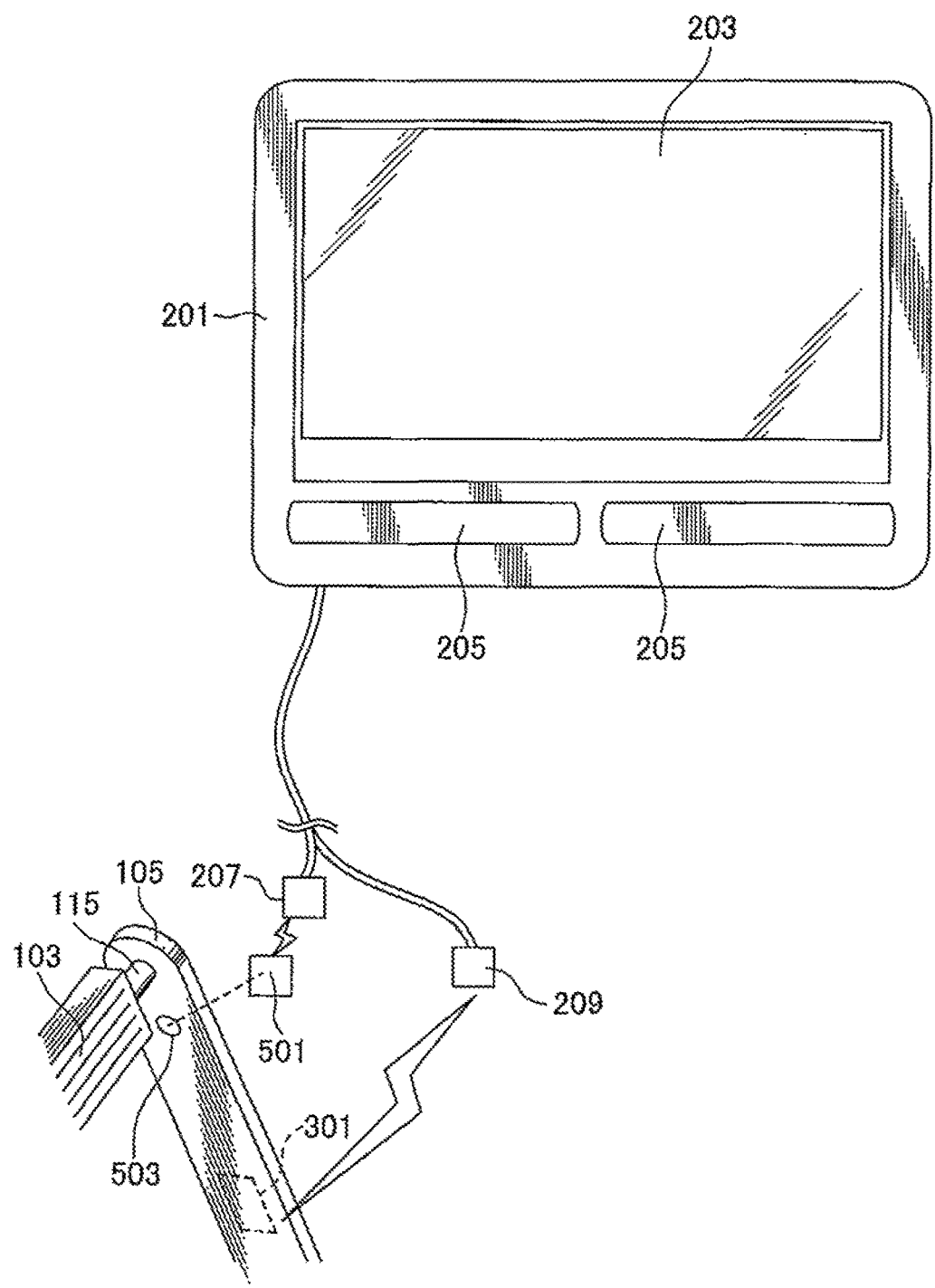
FIG. 2 is an explanatory diagram showing the positional relationship between the cycle computer, the measurement module, and the cadence sensor shown in FIG. 1.

The cycle computer 201 is disposed on the handlebars 9. As shown in FIG. 2, the cycle computer 201 includes a cycle computer display unit 203 for displaying various kinds of information and a cycle computer operation unit 205 for receiving the operation by the user.

Various kinds of information displayed on the cycle computer display unit 203 include the speed, the location information, the distance to the destination, the estimated arrival time to the destination, the travel distance after departure, the elapsed time since departure, the propulsive force, the loss force, and the center position of the load applied to the pedal 103 of the bicycle 1.

Here, the propulsive force means the magnitude of the force applied in the rotation direction of the crank 105, that is, the force acting in the tangential direction of the circle defined by the rotational motion of the crank 105. On the other hand, the loss force means the magnitude of the force applied in a direction different from the rotation direction of the crank 105. The force applied in a direction different from this rotation direction is a useless force that does not contribute to the drive of the bicycle 1 at all. Therefore, the user can drive the bicycle 1 more efficiently by increasing the propulsive force as much as possible and decreasing the loss force as much as possible.

Although the cycle computer operation unit 205 is indicated by a push button in FIG. 2, it is not limited thereto, and a combination of various kinds of input means such as a touch panel and a plurality of input means can be used.

In addition, the cycle computer 201 includes a cycle computer cadence radio receiver 207 and a cycle computer radio receiver 209. The cycle computer cadence radio receiver 207 and the cycle computer radio receiver 209 are connected to the body part of the cycle computer 201 through the wiring line. It should be noted that the cycle computer cadence radio receiver 207 and the cycle computer radio receiver 209 do not need to have a function of only the reception. For example, they may have a function of the transmitter. Hereinafter, a device described as a transmitter or a receiver may also have both the reception function and the transmission function.

Figure 3:
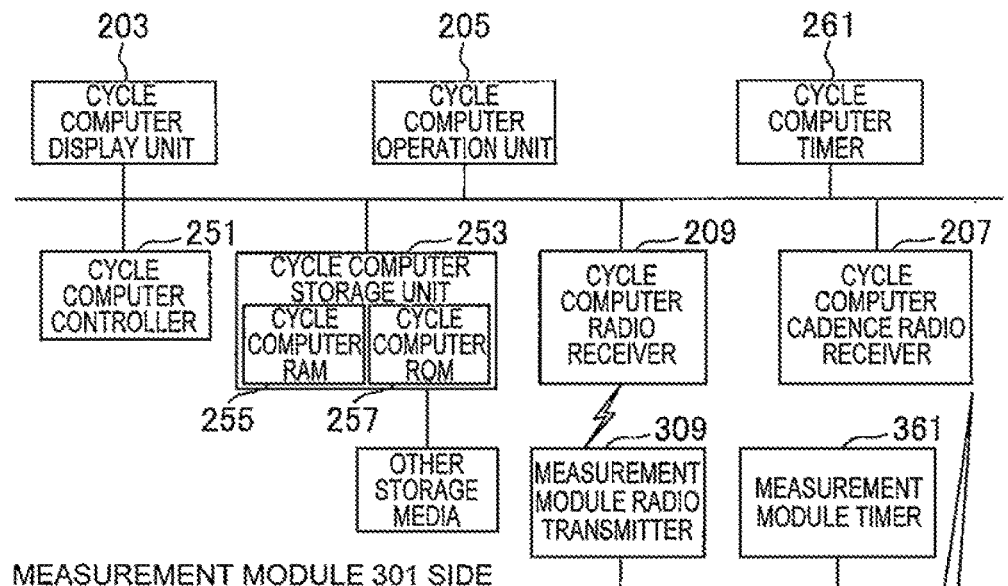
FIG. 3 is a block diagram of the cycle computer, the measurement module, and the cadence sensor shown in FIG. 1.
Figure 3:
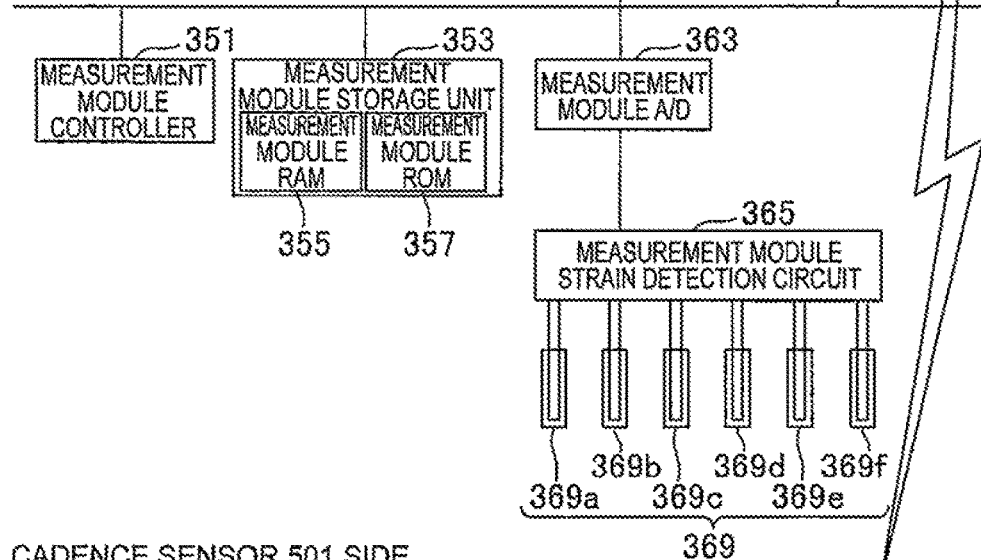
Figure 3:
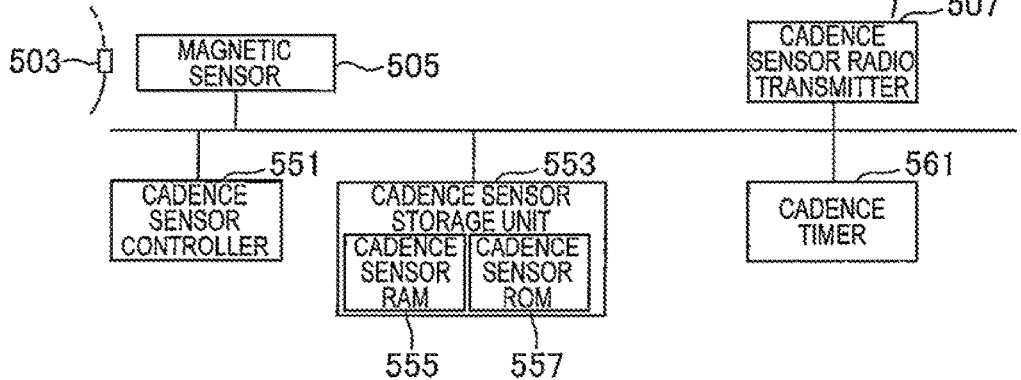

The cadence sensor 501 includes a magnetic sensor 505 for detecting the approach of the magnet 503 provided in the crank 105 (see FIG. 3). The magnetic sensor 505 detects the position of the magnet 503 by being turned ON due to the approaching magnet 503. That is, when the magnetic sensor 505 is turned ON, the crank 105 also exists in the position where the magnetic sensor 505 exists. From this cadence sensor 501, the cycle computer 201 can obtain the cadence [rpm].

Figure 4:
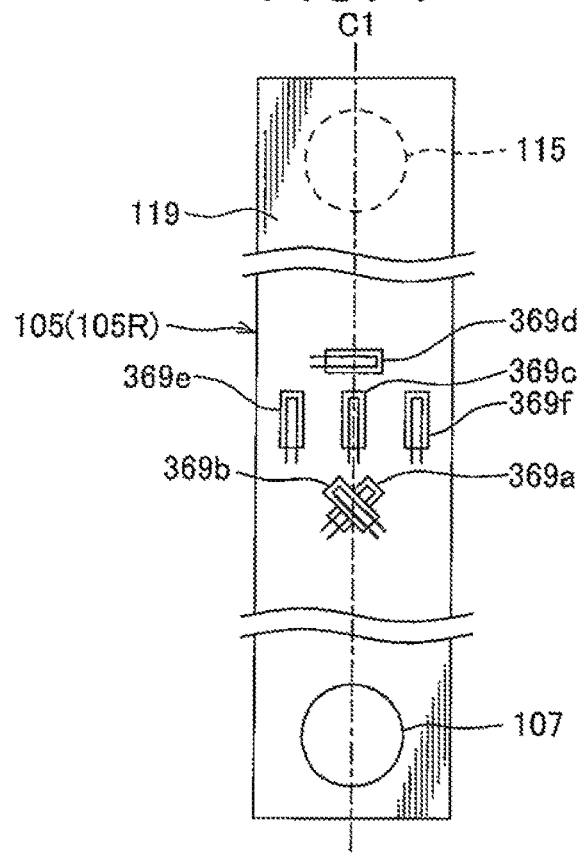
FIG. 4 is an explanatory diagram of the arrangement of the strain gauge shown in FIG. 3 on a crank.

The measurement module 301 is provided on the inner face of the crank 105, and detects the human power applied to the pedal 103 by the user by using the strain gauge 369 including a plurality of strain gauge elements (see FIGS. 3 and 4). Specifically, the measurement module 301 calculates the propulsive force that is the rotation force of the crank 105 and is to be the drive force of the bicycle 1, the loss force that is the force applied in a direction different from the rotation direction, the center position of the load applied to the pedal 103, and the like.

FIG. 3 is a block diagram of the cycle computer 201, the measurement module 301, and the cadence sensor 501.

First, the block configuration of the cadence sensor 501 will be described. The cadence sensor 501 includes a magnetic sensor 505, a cadence sensor radio transmitter 507, a cadence sensor controller 551, a cadence sensor storage unit 553, and a cadence sensor timer 561.

The magnetic sensor 505 is switched between ON and OFF by the approach of the magnet 503. Then, when the magnetic sensor 505 is turned ON, the magnetic sensor 505 outputs an information signal to that effect to the cadence sensor controller 551.

The cadence sensor radio transmitter 507 transmits the cadence information stored in the cadence sensor storage unit 553 to the cycle computer cadence radio receiver 207. The transmission by this cadence sensor radio transmitter 507 is performed, for example, every second by being instructed by the cadence sensor timer 561. Alternatively, the decision based on the value of the cadence sensor timer 561 may be made by the cadence sensor controller 551, and the transmission by this cadence sensor radio transmitter 507 may be performed under the instructions by the cadence sensor controller 551 based on that decision.

The cadence sensor controller 551 comprehensively controls the cadence sensor 501. When receiving the output of the information signal to the effect that the magnetic sensor 505 is turned ON, the cadence sensor controller 551 performs the following operation. The cadence sensor controller 551 instructs the cadence sensor timer 561 to output the timer value information. Then, when receiving the timer value information from the cadence sensor timer 561, the cadence sensor controller 551 calculates the cadence from the timer value information. Specifically, the cadence sensor controller 551 calculates the time (period) [seconds] when the magnetic sensor 505 is turned ON by multiplying the count number (C) of the timer value information by the count interval (T0) for one time. Then, the cadence [rpm] is calculated by dividing 60 by this period.

Furthermore, the cadence sensor controller 551 causes the cadence sensor RAM 555 (described below) of the cadence sensor storage unit 553 to store this cadence information. In addition, the cadence sensor controller 551 outputs counter value reset instruction to the cadence sensor timer 561. The cadence sensor controller 551 may cause the cadence sensor radio transmitter 507 to transmit the cadence information stored in the cadence sensor storage unit 553, for example, at one second intervals.

Various kinds of information are stored in the cadence sensor storage unit 553. Various kinds of information are, for example, a control program of the cadence sensor controller 551, and temporary information required when the cadence sensor controller 551 performs control. In particular, in the present embodiment, the cadence sensor storage unit 553 stores the timer value of the cadence sensor timer 561 that is the interval of time when the magnetic sensor 505 is turned ON. It should be noted that the cadence sensor storage unit 553 includes a cadence sensor RAM 555 and a cadence sensor ROM 557. A timer value and the like are stored in the cadence sensor RAM 555, and a control program and the like are stored in the cadence sensor ROM 557.

The cadence sensor timer 561 is a timer counter, and always counts a clock having a predetermined period. When receiving the value output instruction by the cadence sensor controller 551, the cadence sensor timer 561 outputs the timer value information to the cadence sensor controller 551. In addition, when receiving the reset instruction by the cadence sensor controller 551, the cadence sensor timer 561 resets the value of the timer counter to the initial value. Furthermore, the cadence sensor timer 561 also has the role of instructing the cadence sensor radio transmitter 507 on the timing of transmission. Specifically, the cadence sensor timer 561 instructs the cadence sensor radio transmitter 507 on the transmission timing, for example, every second.

Next, the block configuration of the measurement module 301 will be described. As shown in FIG. 3, the measurement module 301 includes a measurement module radio transmitter 309, a measurement module timer 361, a measurement module controller 351, a measurement module storage unit 353, a measurement module A/D 363, a measurement module strain detection circuit 365, and a strain gauge 369.

The measurement module radio transmitter 309 transmits the propulsive force, the loss force, the center position of the load applied to the pedal 103, and the like calculated from the strain information by the measurement module controller 351 to the cycle computer radio receiver 209. The transmission by this measurement module radio transmitter 309 is performed, for example, every second by being instructed by the measurement module timer 361. Alternatively, the measurement module radio transmitter 309 may transmit them depending on the output of instructions by the measurement module controller 351 based on the value of the measurement module timer 361.

The measurement module timer 361 is a timer counter, and always counts a clock having a predetermined period. Furthermore, the measurement module timer 361 also has the role of instructing the measurement module radio transmitter 309 on the timing of transmission. Specifically, the measurement module timer 361 instructs the measurement module radio transmitter 309 on the transmission timing, for example, every second.

The measurement module controller 351 comprehensively controls the measurement module 301. The measurement module controller 351 calculates the propulsive force, the loss force, the center position of the load applied to the pedal 103, and the like from the strain information. The calculation method will be described below.

Various kinds of information are stored in the measurement module storage unit 353. Various kinds of information are, for example, a control program of the measurement module controller 351, and temporary information required when the measurement module controller 351 performs control. In particular, in the present embodiment, the measurement module storage unit 353 stores strain information. It should be noted that the measurement module storage unit 353 includes a measurement module RAM 355 and a measurement module ROM 357. Strain information and the like are stored in the measurement module RAM 355. A control program and various kinds of parameters, constants, and the like for calculating the propulsive force, the loss force, and the center position of the load applied to the pedal 103 from the strain information are stored in the measurement module ROM 357.

The strain gauge 369 is bonded to the crank 105 to be integrated. The strain gauge 369 includes a first strain gauge 369*a*, a second strain gauge 369*b*, a third strain gauge 369*c*, a fourth strain gauge 369*d*, a fifth strain gauge 369*e*, and a sixth strain gauge 369*f*. Then, each terminal of the strain gauge 369 is connected to the measurement module strain detection circuit 365. It should be noted that the strain gauge 369 is not limited to being provided on the left and right cranks 105, and may be provided only on the crank 105 on one side.

FIG. 4 shows the arrangement of the strain gauge 369 in the present embodiment on the crank 105. The strain gauge 369 is bonded to the inner face 119 of the crank 105. The inner face of the crank 105 is a face on which the crankshaft 107 is protruded (connected), and is a face parallel to a plane including a circle defined by the rotational motion of the crank 105 (side face). In addition, although not shown in FIG. 4, the outer face 120 of the crank 105 is a face, facing the inner face 119, on which the pedal crankshaft 115 is protruded (connected). That is, the outer face 120 of the crank 105 is a face on which the pedal 103 is rotatably provided. The upper face 117 of the crank 105 has a longitudinal direction extending in the same direction as the inner face 119 and the outer face 120, and is one of the faces orthogonal to the inner face 119 and the outer face 120. The lower face 118 of the crank 105 is a face facing the upper face 117. These inner face 119, outer face 120, upper face 117, and lower face 118 constitute the side face of the crank 105.

The first strain gauge 369*a* and the second strain gauge 369*b* are arranged orthogonally to each other and overlapped (layered). In addition, the intermediate direction between the detection direction of the first strain gauge 369*a* and the detection direction of the second strain gauge 369*b* is arranged in such a manner as to be the longitudinal direction of the crank 105. That is, the detection direction of the first strain gauge 369*a* and the longitudinal direction of the crank 105 form an angle of 45 degrees. The detection direction of the second strain gauge 369*b* and the longitudinal direction of the crank 105 form an angle of 45 degrees. In addition, the intersection point portion where the first strain gauge 369*a* and the second strain gauge 369*b* overlap is arranged in such a manner as to be on the central axis C1 of the inner face 119. That is, the first strain gauge 369*a* and the second strain gauge 369*b* are arranged in such a manner as to be symmetrical about the central axis C1.

The third strain gauge 369*c* is provided having a detection direction parallel to the longitudinal direction of the crank 105, that is, parallel to the central axis C1 of the inner face 119 and on the central axis C1. The fourth strain gauge 369*d* is provided having a detection direction perpendicular to the longitudinal direction of the crank 105, that is, perpendicular to the central axis C1 of the inner face 119 and on the central axis C1.

The fifth strain gauge 369*e* and the sixth strain gauge 369*f* are provided having a detection direction parallel to the longitudinal direction of the crank 105, that is, parallel to the central axis C1 of the inner face 119 and in such a manner as to be symmetrical about the central axis C1 of the inner face 119.

That is, the direction parallel to the central axis C1 being an axis extending in the longitudinal direction of the crank 105 (longitudinal direction in FIG. 4), that is, the direction parallel to the longitudinal direction of the crank 105 is the detection direction of the third strain gauge 369*c*, the fifth strain gauge 369*e*, and the sixth strain gauge 369*f*, and the direction perpendicular to the central axis C1 (lateral direction in FIG. 4), that is, the direction perpendicular to the longitudinal direction of the crank 105 is the detection direction of the fourth strain gauge 369*d*. Therefore, the third strain gauge 369*c*, the fifth strain gauge 369*e*, and the sixth strain gauge 369*f* and the fourth strain gauge 369*d* have detection directions orthogonal to each other. That is, the strain gauge 369 functions as a strain detection unit for detecting the strain occurring in the crank 105.

It should be noted that the arrangement of the first strain gauge 369*a* to the sixth strain gauge 369*f* is not limited to the arrangement in FIG. 4. That is, the third strain gauge 369*c* to the sixth strain gauge 369*f* only have to maintain a parallel or perpendicular relation with the central axis C1, and as long as the first strain gauge 369*a* and the second strain gauge 369*b* are be at an oblique angle in such a manner as to face each other across the central axis C1, they may not be at an angle of 45 degrees or may not be overlapped. Furthermore, the first strain gauge 369*a* to the sixth strain gauge 369*f* do not have to be arranged on the inner face 119 of the crank 105, and only have to be arranged in such a manner that at least the propulsive force and the torsional torque described below can be calculated.

In addition, although in FIG. 4, the crank 105 is described as a simple rectangular parallelepiped, corners may be rounded, or part of the surfaces may include curved surfaces depending on the design or the like. Even in such a case, arranging the strain gauge 369 in such a manner as to maintain the above-described arrangement as much as possible allows each deformation described below to be detected. However, as the relation with the above-described central axis C1 and the relation between the first strain gauge 369*a* and the second strain gauge 369*b* that they are orthogonal to each other deviate, the detection accuracy decreases.

The measurement module strain detection circuit 365 is connected to the first strain gauge 369*a*, the second strain gauge 369*b*, the third strain gauge 369*c*, the fourth strain gauge 369*d*, the fifth strain gauge 369*e*, and the sixth strain gauge 369*f*, and outputs the strain amount of the strain gauge 369 as a voltage value. The output of the measurement module strain detection circuit 365 is converted from analog information to strain information that is digital information by the measurement module A/D 363. Then, the strain information signal is output to the measurement module storage unit 353. The strain information signal input into the measurement module storage unit 353 is stored in the measurement module RAM 355 as the strain information.

Figure 5:
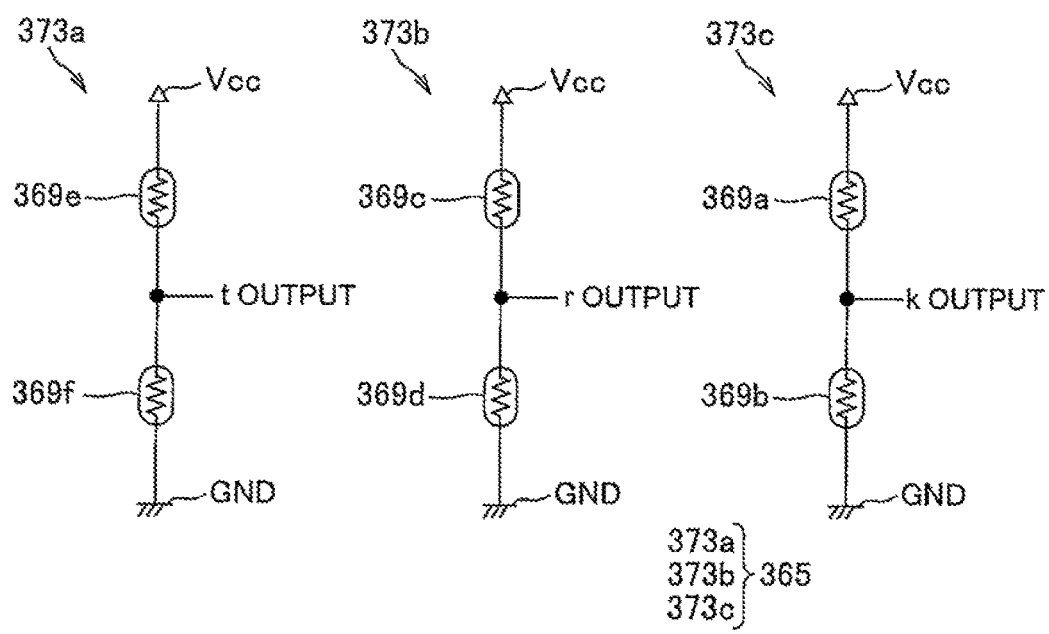
FIG. 5 is a circuit diagram of the measurement module strain detection circuit shown in FIG. 3.

The measurement module strain detection circuit 365 is shown in FIG. 5. The measurement module strain detection circuit 365 includes a first detection circuit 373*a*, a second detection circuit 373*b*, and a third detection circuit 373*c*. In the first detection circuit 373*a*, the fifth strain gauge 369*e* and the sixth strain gauge 369*f* are connected in series between the power supply Vcc and the ground GND. That is, the power supply Vcc, the fifth strain gauge 369*e*, the sixth strain gauge 369*f*, and the ground GND are connected in this order. Then, the connection point between the fifth strain gauge 369*e* and the sixth strain gauge 369*f* serves as the output of the first detection circuit 373*a* (hereinafter referred to as t output).

In the second detection circuit 373*b*, the third strain gauge 369*c* and the fourth strain gauge 369*d* are connected in series between the power supply Vcc and the ground GND. That is, the power supply Vcc, the third strain gauge 369*c*, the fourth strain gauge 369*d*, and the ground GND are connected in this order. Then, the connection point between the third strain gauge 369*c* and the fourth strain gauge 369*d* serves as the output of the second detection circuit 373*b* (hereinafter referred to as r output).

In the third detection circuit 373*c*, the first strain gauge 369*a* and the second strain gauge 369*b* are connected in series between the power supply Vcc and the ground GND. That is, the power supply Vcc, the first strain gauge 369*a*, the second strain gauge 369*b*, and the ground GND are connected in this order. Then, the connection point between the first strain gauge 369*a* and the second strain gauge 369*b* serves as the output of the third detection circuit 373*c* (hereinafter referred to as k output).

Herein, the first strain gauge 369*a* to the sixth strain gauge 369*f* have the same resistance value.

As is well known, the resistance value of the strain gauge 369 decreases when the strain gauge 369 is compressed and increases when the strain gauge 369 is elongated. This change in the resistance value is proportional when the amount of change is small. In addition, the detection direction of the strain gauge 369 is the direction in which the wiring lines extend, and as described above, the third strain gauge 369c, the fifth strain gauge 369e, and the sixth strain gauge 369f are oriented parallel to the central axis C1, and the fourth strain gauge 369d is oriented perpendicular to the central axis C1. The first strain gauge 369a and the second strain gauge 369b are oriented at 45 degrees to the central axis C1. When compression or elongation occurs in a direction other than the detection direction, the change in the resistance value does not occur in the strain gauge 369.

In the first detection circuit 373a using the strain gauge 369 having this characteristic, when compression or elongation is not made in the detection direction of the fifth strain gauge 369e and the sixth strain gauge 369f, the t output is half the voltage value of the voltage of the power supply Vcc (½ Vcc) that is the value obtained by dividing the voltage of the power supply Vcc by the ratio between the resistance value of the fifth strain gauge 369e and the resistance value of the sixth strain gauge 369f.

When the fifth strain gauge 369e is compressed and the sixth strain gauge 369f is elongated, since the resistance value of the fifth strain gauge 369e decreases and the resistance value of the sixth strain gauge 369f increases, the t output rises (voltage value becomes larger than ½ Vcc). When the fifth strain gauge 369e is elongated and the sixth strain gauge 369f is compressed, since the resistance value of the fifth strain gauge 369e increases and the resistance value of the sixth strain gauge 369f decreases, the t output falls (voltage value becomes smaller than ½ Vcc).

When both the fifth strain gauge 369e and the sixth strain gauge 369f are compressed, since the resistance values of both the fifth strain gauge 369e and the sixth strain gauge 369f decrease, the t output does not change (voltage value remains ½ Vcc). When both the fifth strain gauge 369e and the sixth strain gauge 369f are elongated, since the resistance values of both the fifth strain gauge 369e and the sixth strain gauge 369f increase, the t output does not change.

The second detection circuit 373b also operates in the same way as the first detection circuit 373a. That is, when the third strain gauge 369c is compressed and the fourth strain gauge 369d is elongated, the r output rises, and when the third strain gauge 369c is elongated and the fourth strain gauge 369d is compressed, the r output falls. When both the third strain gauge 369c and the fourth strain gauge 369d are compressed and when both the third strain gauge 369c and the fourth strain gauge 369d are elongated, the r output does not change.

The third detection circuit 373c also operates in the same way as the first detection circuit 373a. That is, when the first strain gauge 369a is compressed and the second strain gauge 369b is elongated, the k output rises, and when the first strain gauge 369a is elongated and the second strain gauge 369b is compressed, the k output falls. When both the first strain gauge 369a and the second strain gauge 369b are compressed and when both the first strain gauge 369a and the second strain gauge 369b are elongated, the k output does not change.

The t output of the first detection circuit 373a, the r output of the second detection circuit 373b, and the k output of the third detection circuit 373c are the voltage values output by a plurality of strain gauge parts.

Figure 6A:
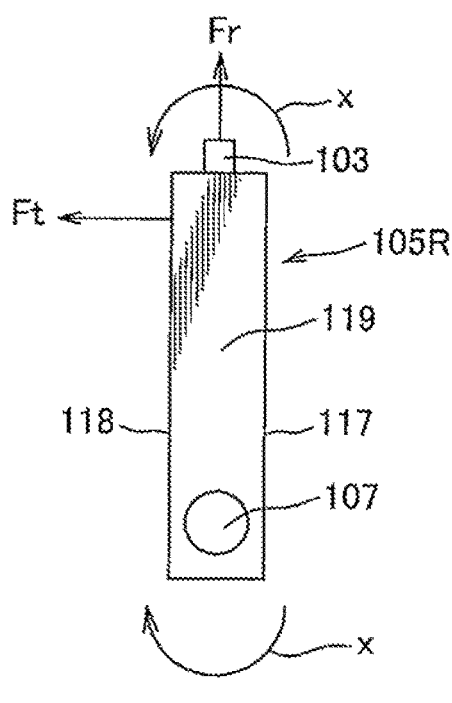
FIGS. 6A to 6C are explanatory diagrams of the force and the deformation applied to the right side crank.
Figure 6B:
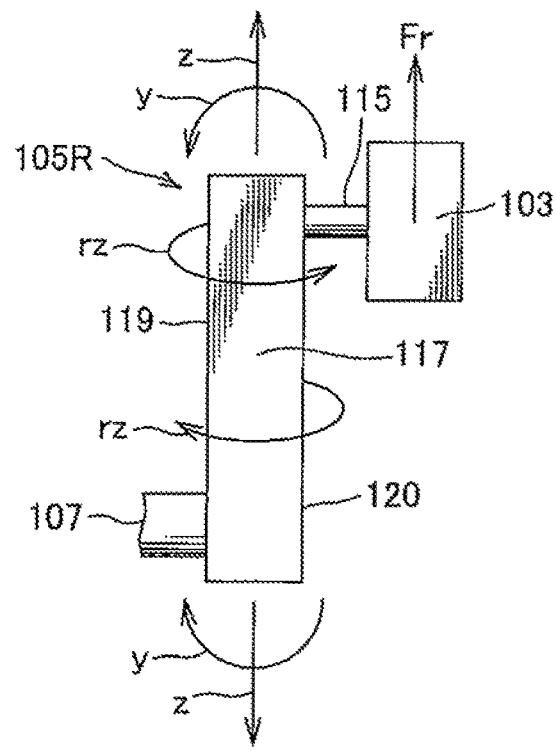
Figure 6C:
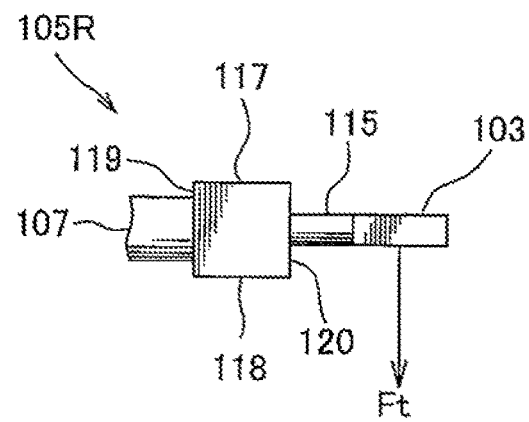

FIGS. 6A to 6C show the deformation state of the right side crank 105R when a force (pedal force) is applied by the user. FIG. 6A is a plan view of the right side crank 105R as seen from the inner face 119, FIG. 6B is a plan view of the right side crank 105R as seen from the upper face 117, and FIG. 6C is a plan view of the right side crank 105R as seen from the end on the crankshaft 107 side. It should be noted that in the following description, the right side crank 105R will be described, but the same applies to the left side crank 105L.

When a pedal force is applied from the user's foot through the pedal 103, the pedal force is divided into the tangential force T (propulsive force) to become a force acting in the tangential direction of a circle defined by the rotational motion of the crank 105, which is the rotation force of the crank 105, and the normal force R (loss force) that is a force acting in the normal direction of the circle defined by the rotational motion of the crank 105. In this case, in the right side crank 105R, each deformation state of the bending deformation x, the bending deformation y, the tensile deformation z, and the torsional deformation rz occurs.

As shown in FIG. 6A, the bending deformation x is a deformation such that the right side crank 105R bends from the upper face 117 toward the lower face 118 or from the lower face 118 toward the upper face 117, and is a deformation caused by the tangential force T. That is, the strain due to the deformation occurring in the rotation direction of the crank 105 (strain occurring in the rotation direction of the crank 105) is detected, and the rotation direction strain occurring in the crank 105 can be detected by the detection of the bending deformation x.

As shown in FIG. 6B, the bending deformation y is a deformation such that the right side crank 105R bends from the outer face 120 toward the inner face 119 or from the inner face 119 toward the outer face 120, and is a deformation caused by the normal force R. That is, the strain due to the deformation occurring from the outer face 120 toward the inner face 119 or from the inner face 119 toward the outer face 120 of the crank 105 (the strain occurring in a direction perpendicular to the same plane as the circle defined by the rotational motion of the right side crank 105R) is detected, and detecting the bending deformation y allows the inner or outer direction strain occurring in the crank 105 to be detected.

The tensile deformation z is a deformation such that the right side crank 105R is elongated or compressed in the longitudinal direction, and is a deformation caused by the normal force R. That is, the strain due to the deformation occurring in a direction in which the crank 105 is pulled or pushed in the longitudinal direction (strain occurring in a direction parallel to the longitudinal direction) is detected, and detecting the tensile deformation z allows the tensile direction strain occurring in the crank 105 to be detected.

The torsional deformation rz is a deformation such that the right side crank 105R is twisted, and is a deformation caused by the tangential force T. That is, the strain due to the deformation occurring in the direction in which the crank 105 twists is detected, and detecting the torsional deformation rz allows the torsional direction strain occurring in the crank 105 to be detected. It should be noted that although in FIGS. 6A to 6C, the deformation directions of the bending deformation x, the bending deformation y, the tensile deformation z, and the torsional deformation rz are indicated by arrows, each deformation may occur in the direction opposite to this arrow as described above.

Therefore, in order to measure the tangential force T, any one of the bending deformation x and the torsional deformation rz only has to be quantitatively detected, and in order to measure the normal force R, any one of the bending deformation y and the tensile deformation z only has to be quantitatively detected.

Here, a method for detecting (measuring) the bending deformation x, the bending deformation y, the tensile deformation z, and the torsional deformation rz by using the measurement module strain detection circuit 365 to which the first strain gauge 369a, the second strain gauge 369b, the third strain gauge 369c, and the fourth strain gauge 369d arranged as shown in FIG. 4 are connected as shown in FIG. 5 will be described.

Figure 7:
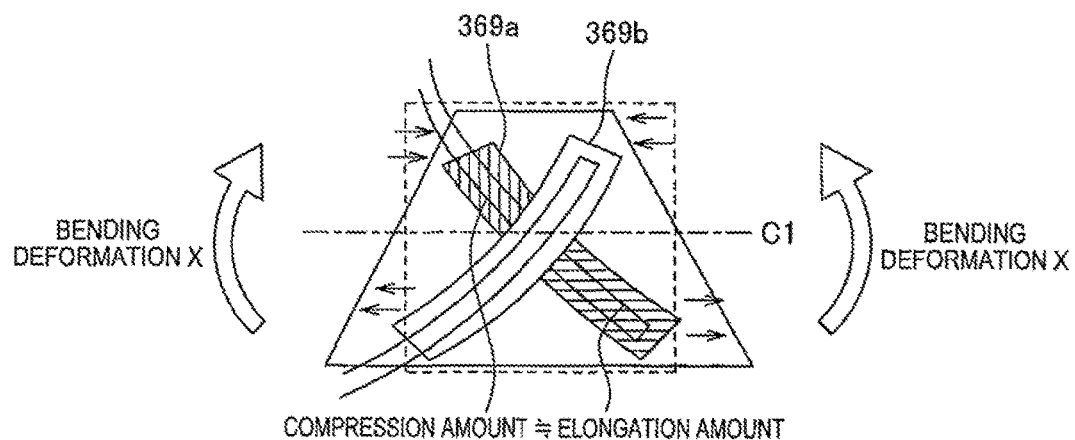
FIG. 7 is an explanatory diagram of a case where the first strain gauge and the second strain gauge are deformed by the bending deformation x.

In the bending deformation x, the right side crank 105R is deformed from the upper face 117 toward the lower face 118 or in the opposite direction. In this case, the first detection circuit 373a becomes any one of the state where the fifth strain gauge 369e has a decreased resistance value by compression, the sixth strain gauge 369f has an increased resistance value by elongation, and the t output rises, and the state where the fifth strain gauge 369e has an increased resistance value by elongation, the sixth strain gauge 369f has a decreased resistance value by compression, and the t output falls (determined by the direction of the deformation). In the second detection circuit 373b, both the third strain gauge 369c and the fourth strain gauge 369d are only bent, they are neither compressed nor elongated, and the resistance values do not change, and therefore the r output does not change. In the third detection circuit 373c, as shown in FIG. 7, one end of the first strain gauge 369a is elongated, but the other end is compressed. As a result, both elongation and compression occur inside the first strain gauge 369a, and the resistance value of the first strain gauge 369a does not change. The same applies to the second strain gauge 369b. Therefore, the k output does not change.

In the bending deformation y, the right side crank 105R is deformed from the outer face 120 toward the inner face 119 or in the opposite direction. In this case, since the first detection circuit 373a becomes any one of the state where both the fifth strain gauge 369e and the sixth strain gauge 369f have increased resistance values by elongation, and the state where both of them have decreased resistance values by compression, the t output does not change. The second detection circuit 373b becomes any one of the state where the third strain gauge 369c has an increased resistance value by elongation, the fourth strain gauge 369d has a decreased resistance value by compression, and the r output falls, and the state where the third strain gauge 369c has a decreased resistance value by compression, the fourth strain gauge 369d has an increased resistance value by elongation, and the r output rises. Since the third detection circuit 373c becomes any one of the state where both the first strain gauge 369a and the second strain gauge 369b have increased resistance values by elongation, and the state where both of them have decreased resistance values by compression, the k output does not change.

The tensile deformation z is a deformation such that the right side crank 105R is elongated or compressed in the longitudinal direction. In this case, since the first detection circuit 373a becomes any one of the state where both the fifth strain gauge 369e and the sixth strain gauge 369f have increased resistance values by elongation, and the state where both of them have decreased resistance values by compression, the t output does not change. The second detection circuit 373b becomes any one of the state where the third strain gauge 369c has an increased resistance value by elongation, the fourth strain gauge 369d has a decreased resistance value by compression, and the r output falls, and the state where the third strain gauge 369c has a decreased resistance value by compression, the fourth strain gauge 369d has an increased resistance value by elongation, and the r output rises. Since the third detection circuit 373c becomes any one of the state where both the first strain gauge 369a and the second strain gauge 369b have increased resistance values by elongation, and the state where both of them have decreased resistance values by compression, the k output does not change.

The torsional deformation rz is a deformation such that the right side crank 105R twists. In this case, in the first detection circuit 373a, the fifth strain gauge 369e has an increased resistance value by elongation, but the sixth strain gauge 369f has an unchanged resistance value by neither compression nor elongation, so the t output falls. In the second detection circuit 373b, the third strain gauge 369c has an increased resistance value by elongation, but the fourth strain gauge 369d has an unchanged resistance value by neither compression nor elongation, so the r output falls. The third detection circuit 373c becomes any one of the state where the first strain gauge 369a has a decreased resistance value by compression, the second strain gauge 369b has an increased resistance value by elongation, and the k output rises, and the state where the first strain gauge 369a has an increased resistance value by elongation, the second strain gauge 369b has a decreased resistance value by compression, and the k output falls.

As described above, detecting the change in the t output of the first detection circuit 373a allows the bending deformation x to be detected, and detecting the change in the r output of the second detection circuit 373b allows the bending deformation y and the tensile deformation z to be detected. Furthermore, detecting the change in the k output of the third detection circuit 373c allows the torsional deformation rz to be detected. That is, the fifth strain gauge 369e and the sixth strain gauge 369f constituting the first detection circuit 373a serve as the first strain gauge part, and the first strain gauge 369a and the second strain gauge 369b constituting the third detection circuit 373c serve as the second strain gauge part. Then, the t output of the first detection circuit 373a and the k output of the third detection circuit 373c represent the output values of the strain detection unit.

Next, a method for calculating the tangential force T, the normal force R, and the torsional torque K from the t output of the first detection circuit 373a, the r output of the second detection circuit 373b, and the k output of the third detection circuit 373c by using the measurement module controller 351 will be described. The torsional torque is the torque when the torsional deformation rz occurs in the crank 105, that is, the torque acting in the direction causing the crank 105 to twist. First, a matrix A is assumed as in the following equation (1).

[Math. 1]

$$\begin{pmatrix} t \\ r \\ k \end{pmatrix} = A \cdot \begin{pmatrix} T \\ R \\ K \end{pmatrix} = \begin{pmatrix} a & b & c \\ d & e & f \\ g & h & i \end{pmatrix} \begin{pmatrix} T \\ R \\ K \end{pmatrix} \quad (1)$$

The t, the r, and the k in the equation (1) respectively represent the actually measured values (voltage values) of the t output, the r output, and the k output. In addition, the T represents the tangential force T, the R represents the normal force R, and the K represents the torsional torque K.

Figure 8A:
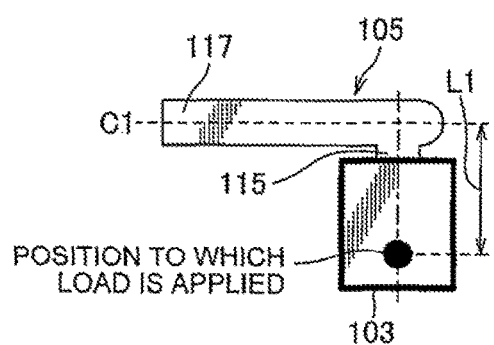
FIGS. 8A and 8B are explanatory diagrams of a first state.
Figure 8B:
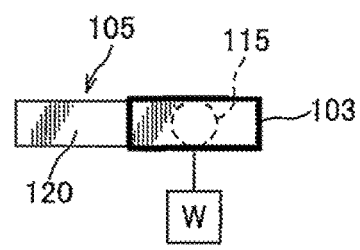

Next, as shown in FIGS. 8A and 8B, assuming that the crank 105 is oriented horizontally forward, and the t output, the r output, and the k output in the state where a known load W is applied to a position on the pedal 103 at a distance L1 from the central axis C1 of the crank 105 (first state) are respectively denoted by tp, rp, and kp, the equation (1) is expressed as the equation (2). Here, FIG. 8A is a view of the crank 105 as seen from the upper face 117, and FIG. 8B is a view of the crank as seen from the outer face 120.

[Math. 2]

$$\begin{pmatrix} tp \\ rp \\ kp \end{pmatrix} = A \cdot \begin{pmatrix} W \\ 0 \\ P \end{pmatrix} \quad (2)$$

The P is the first reference torsional torque applied to the crank 105, and is expressed by P=W·L1(N·m).

Figure 9A:
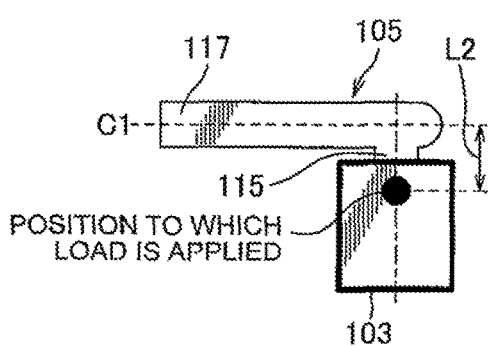
FIGS. 9A and 9B are explanatory diagrams of a second state.
Figure 9B:
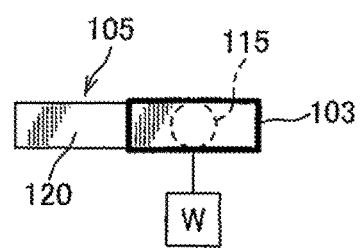

Next, as shown in FIGS. 9A and 9B, assuming that the crank 105 is oriented horizontally forward, and the t output, the r output, and the k output in the state where a known load W is applied to a position on the pedal 103 at a distance L2, different from the distance L1, from the central axis C1 of the crank 105 (second state) are respectively denoted by tq, rq, and kq, the equation (1) is expressed as the equation (3). Here, FIG. 9A is a view of the crank 105 as seen from the upper face 117, and FIG. 9B is a view of the crank as seen from the outer face 120.

[Math. 3]

$$\begin{pmatrix} tq \\ rq \\ kq \end{pmatrix} = A \cdot \begin{pmatrix} W \\ 0 \\ Q \end{pmatrix} \quad (3)$$

The Q is the second reference torsional torque applied to the crank 105, and is expressed by Q=W·L2(N·m).

Figure 10A:
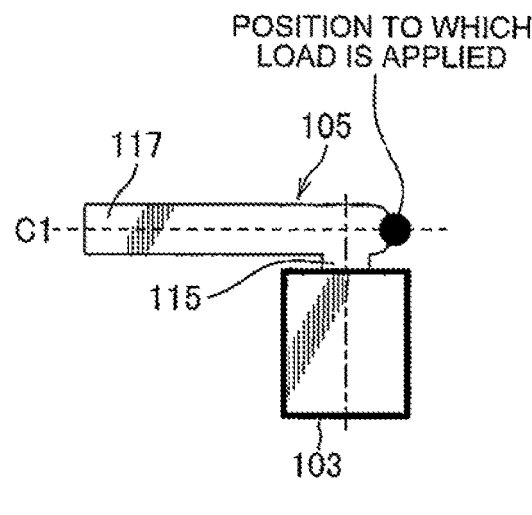
FIGS. 10A and 10B are explanatory diagrams of a third state.
Figure 10B:
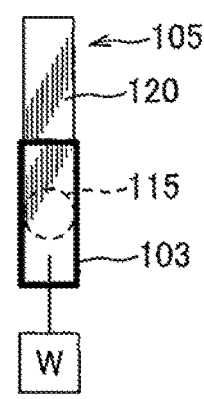

Next, as shown in FIGS. 10A and 10B, assuming that the crank 105 is oriented vertically downward, and the t output, the r output, and the k output in the state where a known load W is applied to a position on the extension of the central axis C1 of the crank 105 (or the position as close as possible to the central axis of the crank 105)(third state) are respectively denoted by t0, r0, and k0, the equation (1) is expressed as the equation (4). FIG. 10A is a view of the crank 105 as seen from the upper face 117, and FIG. 10B is a view of the crank as seen from the outer face 120.

[Math. 4]

$$\begin{pmatrix} t0 \\ r0 \\ k0 \end{pmatrix} = A \cdot \begin{pmatrix} 0 \\ W \\ 0 \end{pmatrix} \quad (4)$$

Next, components a to i of matrix A are calculated from equations (2) to (4). From the equations (2) and (3), the components c, a, f, d, i, and g are given by the following equations (5) to (10). In addition, from the equation (4), the components b, e, and h are given by the following equations (11) to (13). Here, although the components remain in equations (6), (8), and (10), this only has to be done by substituting the calculated components. For example, the calculation result of the equation (5) is substituted for the component c of the equation (6). Alternatively, instead of the calculation result, an expression may be substituted. In this way, components a to i of matrix A are calculated from the values of the t output, the r output, and the k output in the states of FIGS. 8A to 10B, the known load W, and the known distances L1 and L2.

[Math. 5]

$$c = (tp - tq)/(P - Q) = (tp - tq)/(W(L1 - L2)) \quad (5)$$

$$a = (tp - Pc)/W = (tp - WL1c)/W \quad (6)$$

$$f = (rp - rq)/(P - Q) = (rp - rq)/(W(L1 - L2)) \quad (7)$$

$$d = (rp - Pf)/W = (rp - WL1f)/W \quad (8)$$

$$i = (kp - kq)/(P - Q) = (kp - kq)/(W(L1 - L2)) \quad (9)$$

$$g = (kp - Pi)/W = (kp - WL1i)/W \quad (10)$$

[Math. 6]

$$b = t0/W \quad (11)$$

$$e = r0/W \quad (12)$$

$$h = k0/W \quad (13)$$

Then, the inverse matrix $A^{-1}$ of the calculated matrix A is calculated, and the tangential force T, the normal force R, and the torsional torque K are calculated from the following equation (14). Therefore, calculating the inverse matrix $A^{-1}$ in advance allows the tangential force T, the normal force R, and the torsional torque K to be calculated from the values of the t output, the r output, and the k output in real time.

[Math. 7]

$$\begin{pmatrix} T \\ R \\ K \end{pmatrix} = A^{-1} \cdot \begin{pmatrix} t \\ r \\ k \end{pmatrix} \quad (14)$$

Since equation (14) can be expressed by a polynomial with coefficients of the components of the inverse matrix $A^{-1}$, the tangential force T and the torsional torque K are calculated by substituting the t output, the r output, and the k output output by the first detection circuit 373a to the third detection circuit 373c into a predetermined polynomial.

Then, the distance L from the central axis of the crank 105 to the center of the load applied to the pedal 103 by the cyclist is calculated from the calculated tangential force T and torsional torque K. Here, when the load acting on each part of the pedal 103 is represented by a single force, the center of load means the point on which the single force acts. The distance L from the central axis of the crank 105 to the center of the load applied to the pedal 103 by the cyclist can be calculated by L(m)=K/T. In the present embodiment, the calculated distance L is set to the center position of the load applied to the pedal 103.

Next, the block configuration of the cycle computer 201 will be described. As shown in FIG. 3, the cycle computer 201 includes a cycle computer display unit 203, a cycle computer operation unit 205, a cycle computer cadence radio receiver 207, a cycle computer radio receiver 209, a cycle computer timer 261, a cycle computer storage unit 253, and a cycle computer controller 251.

The cycle computer display unit 203 displays various kinds of information based on the user's instructions or the like. In the present embodiment, the propulsive force (tangential force T) and the loss force (normal force R) are visualized to be displayed. It should be noted that the method of visualization can be any method. The visualization method in the cycle computer display unit 203 may include, for example, a vector display, a graph display, a color-coded display, a symbol display, a three-dimensional display, and any method may be used. In addition, a combination thereof or the like may be used.

In addition, the cycle computer display unit 203 visualizes the center position of the load applied to the pedal 103 calculated by the measurement module controller 351 to display. The display example is shown in FIG. 11.

Figure 11:
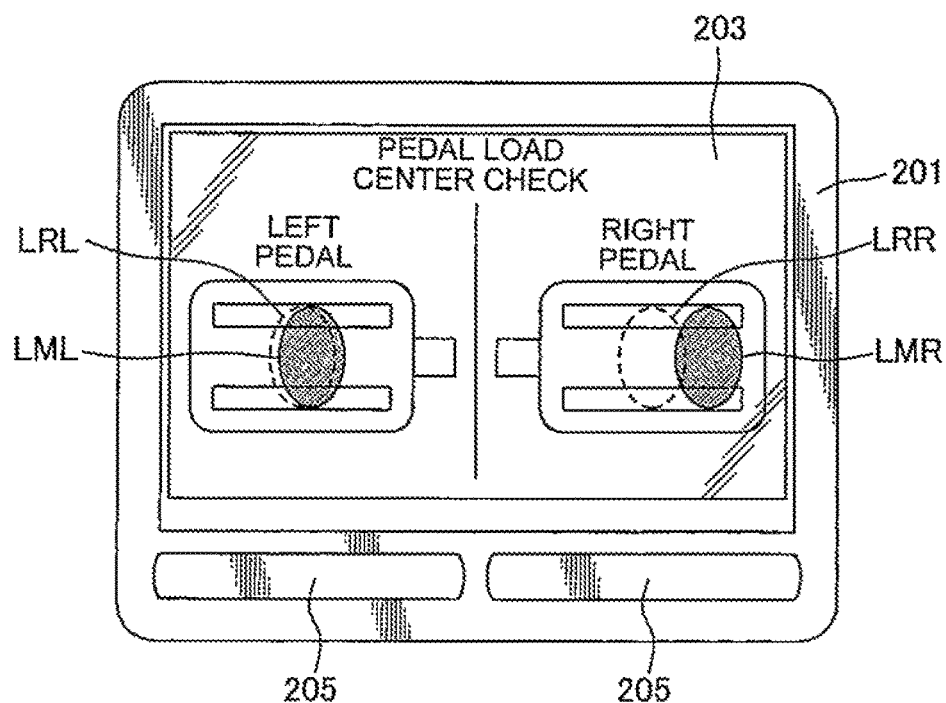
FIG. 11 is an explanatory diagram of a display example on the cycle computer display unit shown in FIG. 1.
Figure 12A:
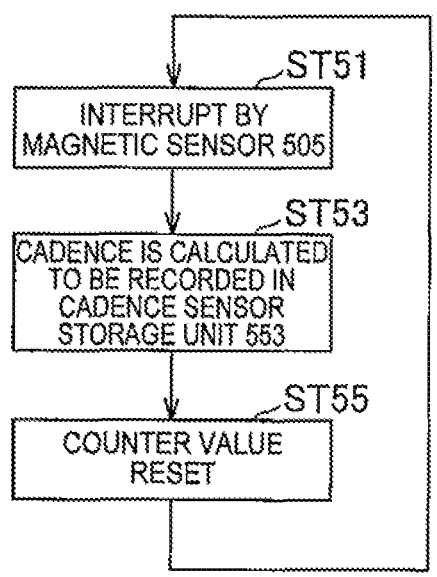
FIGS. 12A and 12B are flowcharts of the processing of the cadence sensor shown in FIG. 3.
Figure 12B:
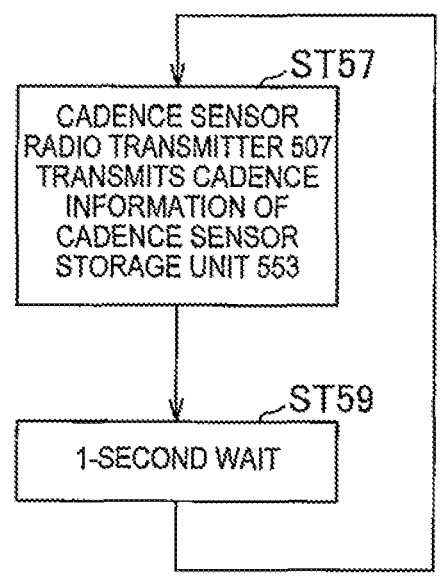
Figure 13A:
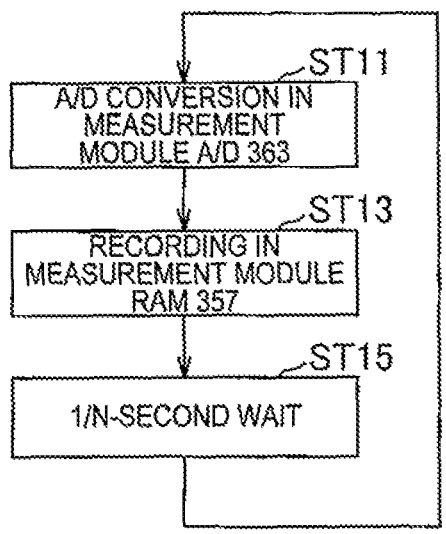
FIGS. 13A to 13C are flowcharts of the processing of the measurement module and the cycle computer shown in FIG. 3.
Figure 13B:
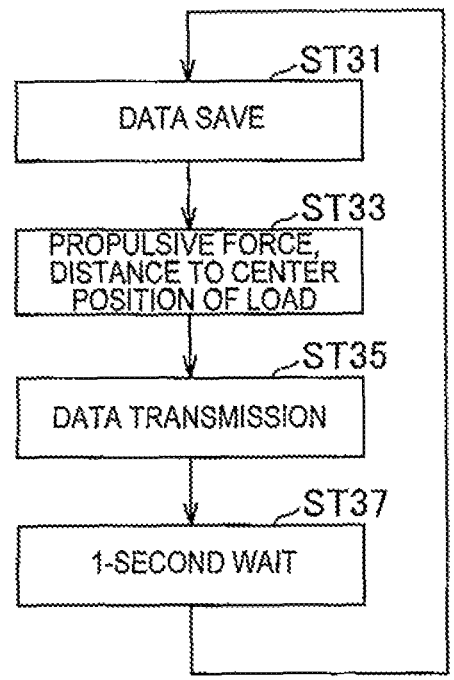
Figure 13C:
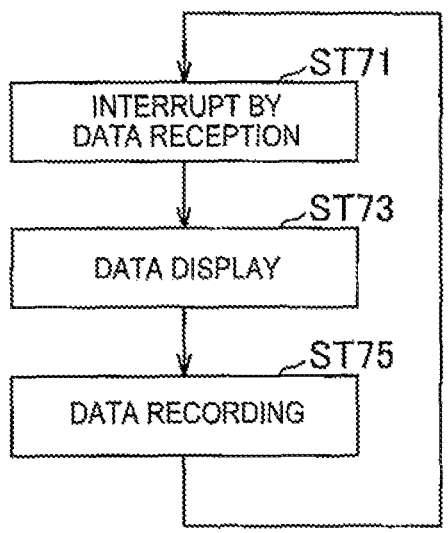

FIG. 11 displays the center positions of the loads detected for the left and right pedals 103 side by side on the screen. In FIG. 11, the center position of the load detected in the right side pedal 103R is displayed as the measured value LMR, and the center position of the load detected in the left side pedal 103L is displayed as the measured value LML. In addition, the center positions of the loads set as a reference in advance are superimposed on the measured values LMR and LML as the reference value LRR (right side) and the reference value LRL (left side) to be displayed. The reference values LRR and LRL are shown, for example, as the recommended pedal stepping positions (positions to which loads should be applied). That is, the measured values LMR and LML and the reference values LRR and LRL are displayed (output) in a comparable manner. It should be noted that although in FIG. 11, the reference values LRR and LRL are approximately at the center of the pedals 103, they are not limited thereto. For example, the reference values LRR and LRL may be changed based on the shape and the like of the bicycle 1 or the crank 105, or the physique and the like of the cyclist.

In FIG. 11, displaying the measured values LMR and LML as filled ellipses and displaying the reference values LRR and LRL as ellipses (broken lines) makes it easier to visually identify them when the superimposed display is performed. It should be noted that the measured values LMR and LML and the reference values LRR and LRL are not limited to the shapes in FIG. 11, and may be points, circles, straight lines, footprints, or the like. In addition, the measured values LMR and LML and the reference values LRR and LRL are not limited to filling and broken lines, and only have to be the display modes that can be distinguished from each other.

It should be noted that although the measured values and the reference values are shown as images in the example shown in FIG. 11, they are not limited thereto and may be shown in other forms such as numerical values. In addition, measured values in any period may be stored and displayed so that the transition of the movement of the position can be known.

The cycle computer operation unit 205 receives instructions from the user (input). For example, the cycle computer operation unit 205 receives instructions on display contents on the cycle computer display unit 203 from the user.

The cycle computer cadence radio receiver 207 receives the cadence information transmitted from the cadence sensor 501.

The cycle computer radio receiver 209 receives the propulsive force, the loss force, the center position of the load applied to the pedal 103, and the like transmitted from the measurement module 301.

The cycle computer timer 261 is a timer counter and counts the timer. This timer value information generated by the cycle computer timer 261 is used by the cycle computer controller 251 and the like variously.

Various kinds of information are stored in the cycle computer storage unit 253. Various kinds of information are, for example, a control program of the cycle computer controller 251, and temporary information required when the cycle computer controller 251 performs control. It should be noted that the cycle computer storage unit 253 includes a cycle computer RAM 255 and a cycle computer ROM 257. In the cycle computer ROM 257, the control program, the propulsive force, and the loss force or various kinds of parameters, constants, and the like for converting the center position of the load into the data to be visually displayed on the cycle computer display unit 203 are stored.

The cycle computer controller 251 comprehensively controls the cycle computer 201. Furthermore, the cycle computer controller 251 may also control the cadence sensor 501 and the measurement module 301 in a comprehensive manner. The cycle computer controller 251 converts the propulsive force, the loss force, or the center position of the load into the data to be visually displayed on the cycle computer display unit 203.

Next, the processing of the cadence sensor 501 and the processing of the measurement module 301 and the cycle computer 201 will be described with reference to FIGS. 12A, 12B, 13A, and 13C.

First, the processing of the cadence sensor 501 will be described. In step ST51, the cadence sensor controller 551 of the cadence sensor 501 detects a change of the magnetic sensor 505 to the ON state. Then, the cadence sensor controller 551 interrupts the processing when detecting a change in the magnetic sensor 505, and starts the processing in and after step ST53. Interruption means stopping the processing up to that point and executing the designated processing.

Next, in step ST53, the cadence sensor controller 551 calculates the cadence value. The cadence sensor controller 551 calculates the time (period) [seconds] when the magnetic sensor 505 is turned ON by multiplying the count number (C) of the timer value information by the count interval (T) for one time. Then, the cadence sensor controller 551 calculates cadence [rpm] by dividing 60 by this time (period). Furthermore, the cadence sensor controller 551 causes the cadence sensor RAM 555 of the cadence sensor storage unit 553 to store this cadence information.

Next, in step ST55, the cadence sensor controller 551 outputs a reset instruction of the counter value to the cadence sensor timer 561. Thus, the main flow of the control of the cadence sensor controller 551 is terminated. Then, next, when the magnetic sensor 505 is turned ON, the interruption is performed again, and the processing is restarted from step ST51.

On the other hand, in step ST57, the cadence sensor controller 551 transmits the cadence information stored in the cadence sensor storage unit 553 to the cycle computer 201 by using the cadence sensor radio transmitter 507. It should be noted that the transmission may be performed only by the cadence sensor radio transmitter 507 without using the cadence sensor controller 551.

Next, in step ST59, the cadence sensor controller 551 waits for 1 second. It should be noted that the wait time is variable.

Next, the processing of the measurement module 301 and the like will be described. In step ST11, the measurement module A/D 363 performs the A/D conversion on the outputs from the measurement module strain detection circuit 365 (t output, r output, and k output) from analog values to digital values.

Next, in step ST13, the strain information detected (converted) by the measurement module A/D 363 is stored in the measurement module RAM 355 of the measurement module storage unit 353.

Next, in step ST15, the process waits for 1/N seconds. Here, the value of N is the number of data points measured per second. That is, the larger the value of N, the greater the number of strain information, which means that the resolution in seconds is higher. The larger the N value is, the better it is, but if the N value is made too large, the measurement module RAM 355 has to have a large capacity, resulting in an increase in cost. Therefore, how much the N value should be may be determined by cost, required time resolution, the time required for the measurement module A/D 363 to perform the A/D conversion, and the like. When the process in step ST15 ends, the process returns to step ST11 again. That is, the processing from step ST11 to step ST15 is repeated N times per second.

In addition, the measurement module controller 351 performs the processing in FIG. 9B. In step ST31, the measurement module controller 351 saves the data of the strain information. The reason for this will be described. First, the capacity of the measurement module RAM 355 of the measurement module storage unit 353 is limited. Here, if the capacity of the measurement module RAM 355 is increased, saving the data of the strain information is unnecessary, but designing with too much margin results in an increase in cost and is not appropriate. In addition, since the strain information is continuously written one after another, if the data saving is not performed, new information may be overwritten before the tangential force T, the normal force R, and the distance L are calculated by the processing in step ST33 described below.

Next, in step ST33, the measurement module controller 351 calculates the tangential force T, the normal force R, and the distance L. Specifically, the measurement module controller 351 calculates the tangential force T, the normal force R, and the distance L by using the above-described equation (14) and the equation of L=K/T. That is, this step functions as the calculation step. Furthermore, the measurement module controller 351 may calculate N pieces of the tangential force T, the normal force R, and the distance L, and may calculate the average thereof. That is, the measurement module controller 351 may calculate the average of the tangential force T and the normal force R per second (average tangential (propulsive) force and average normal (loss) force). It should be noted that the measurement of the first state to the third state, the calculation of the components, and the like are performed in advance before the execution of this flowchart as described above.

Next, in step ST35, the measurement module controller 351 transmits the calculated tangential force T and normal force R or the average tangential force and average normal force, and the distance L through the measurement module radio transmitter 309. The transmitted tangential force T, the normal force R, and the like and the distance L are received by the cycle computer radio receiver 209 of the cycle computer 201. That is, information on the center position of the load applied to the pedal 103 connected to the crank 105 is output based on the tangential force T and the torsional torque K calculated based on the output value of the strain gauge 369.

Next, in step ST37, the process waits for 1 second. It should be noted that 1 second is an example and the period is variable as necessary. When the process in step ST37 ends, the process returns to step ST31 again. That is, the processing from step ST31 to step ST35 is repeated once per second.

In addition, the cycle computer controller 251 of the cycle computer 201 performs the processing in FIG. 9(c). In step ST71, when the cycle computer controller 251 receives the propulsive force (tangential force T), the loss force (normal force R), the center position of the load (distance L), and the cadence information, an interrupt is performed. That is, when the cycle computer controller 251 detects that the cycle computer radio receiver 209 has received the propulsive force, the loss force, the center position of the load, and the cadence information, the cycle computer controller 251 suspends (interrupts) the processing up to that point and starts the processing in and after step ST73.

Next, in step ST73, the cycle computer controller 251 causes the cycle computer display unit 203 to display the propulsive force, the loss force, the center position of the load, and the cadence information. That is, this step functions as the output step. The cycle computer display unit 203 transmits these pieces of information to the user by displaying them as numerical values or by using other visualization/audition/haptization methods. It should be noted that these pieces of information do not need to be displayed at the same time, and may be individually displayed with a switching operation by the user or the like.

Next, in step ST75, the cycle computer controller 251 stores the propulsive force, the loss force, the center position of the load, and the cadence information in the cycle computer RAM 255 of the cycle computer storage unit 253. Subsequently, the cycle computer controller 251 performs the other processing until an interrupt of step ST51 is performed again.

Although the center position of the load (distance L) is calculated by the measurement module 301 in the above description, the torsional torque K may be transmitted to the cycle computer 201 instead of the center position of the load (distance L), and the center position of the load (distance L) may be calculated by the cycle computer 201.

According to the present embodiment, the strain gauge 369 is provided on the inner face 119 of the crank 105 of the bicycle 1 and detects the strain occurring in the crank 105. Then, the cycle computer display unit 203 displays an image showing the center position of the load applied to the pedal 103 connected to the crank 105 based on the tangential force T and the torsional torque K calculated based on the output values of the first strain gauge 369a to the sixth strain gauge 369f. Since this allows an image indicating the center position of the load applied to the pedal 103 to be calculated to be output, efficient pedaling or the like may be performed based on this information.

In addition, the strain gauge 369 is provided on the inner face 119 of the crank 105 which the bicycle 1 includes on the left and right sides in a pair, and the cycle computer display unit 203 displays side by side the images showing the center positions of the loads applied to the pedals 103 connected to the left and right cranks 105. This allows the user and the like to compare and check the left and right pedaling balance and the like, and therefore this can help improve pedaling forms and the like.

In addition, the cycle computer display unit 203 displays an image in which the reference values LRR and LRL are superimposed in advance on the measured values LMR and LML detected by the strain gauge 369. This allows, for example, the user and the like to compare the center of the load in their own pedaling with the center of the load in the appropriate pedaling, and therefore this can help improve pedaling forms and the like.

In addition, the strain gauge 369 includes a plurality of strain gauges including the first strain gauge 369a and the second strain gauge 369b for detecting the bending deformation x occurring in the crank 105 and the fifth strain gauge 369e and the sixth strain gauge 369f for detecting the torsional deformation rz occurring in the crank 105. In addition, the strain gauge 369 outputs a voltage value according to the deformation amount of the crank 105 in the direction in which the first strain gauge 369a and second strain gauge 369b and the fifth strain gauge 369e and sixth strain gauge 369f detect strain. This allows the tangential force T and the torsional torque K of the crank 105 to be calculated with the output voltage values of the plurality of strain gauges 369.

In addition, the tangential force T and the torsional torque K of the crank 105 are calculated by substituting the voltage values output by the third detection circuit 373c including the first strain gauge 369a and the second strain gauge 369b, and the first detection circuit 373a including the fifth strain gauge 369e and the sixth strain gauge 369f (t output and k output) into a predetermined polynomial. This allows the force and the torque to be calculated by the calculation using, for example, a CPU or the like.

In addition, the coefficient of each term of the predetermined polynomial is set in advance based on the first reference torsional torque P applied to the crank 105 in the first state where a predetermined load W is applied to the position on the pedal 103 apart from the central axis of the crank 105 by the first distance L1, the second reference torsional torque Q applied to the crank 105 in the second state where a predetermined load W is applied to the position on the pedal 103 apart from the central axis of the crank 105 by the second distance L2, and the t output and the k output in each of the first state and the second state. This allows the coefficients to be calculated in advance based on the first reference torsional torque P, the second reference torsional torque Q, and the output voltage values (tp, kp, tq, and kq), which can be calculated with known numerical values. Therefore, the tangential force T of the crank 105 and the torsional torque K of the crank 105 can be calculated only by substituting the values measured by the first detection circuit 373a and the third detection circuit 373c into the polynomial. In addition, since the coefficient can be changed according to the crank, the tangential force T of the crank 105 and the torsional torque K of the crank 105 can be accurately calculated for each crank.

Second Embodiment

Figure 14:
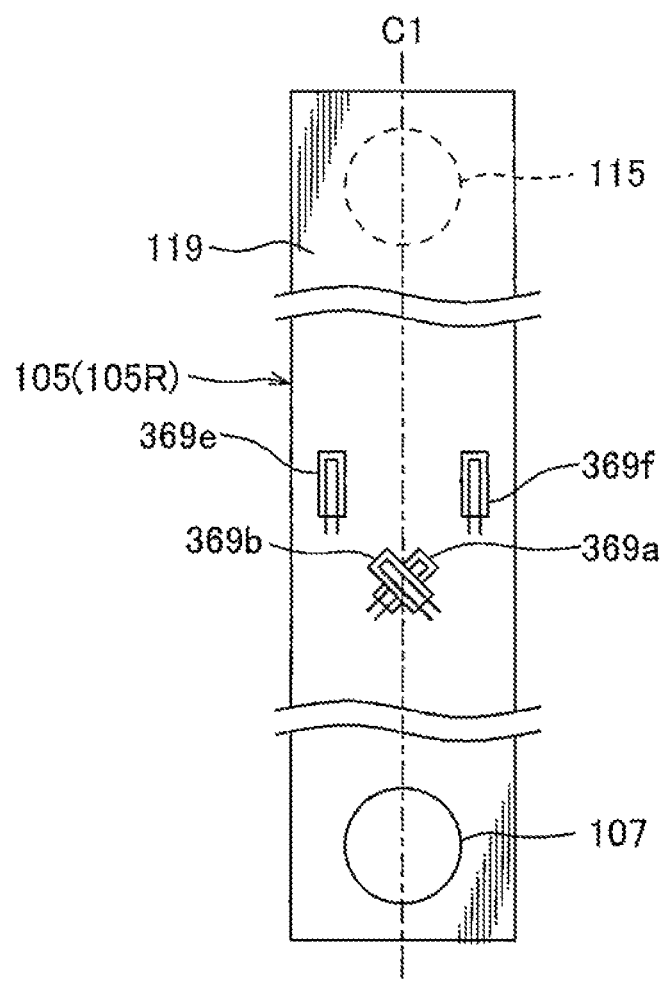
FIG. 14 is an explanatory diagram of an arrangement of the strain gauge on the crank of the information output device according to a second embodiment of the present invention.

The information output device according to the second embodiment of the present invention will be described with reference to FIG. 14. It should be noted that the same parts as those in the first embodiment described above are denoted by the same reference numerals, and description thereof is omitted.

Although six strain gauges are used in the first embodiment, when the normal force R (loss force) is not calculated, the number of strain gauges can be reduced, and the amount of calculation involved in the calculation of the coefficients and the calculation of the tangential force T and the torsional torque K can be reduced. FIG. 14 shows the arrangement of the strain gauge 369 in the present embodiment on the crank 105. This embodiment is different from the first embodiment in that the third strain gauge 369c and the fourth strain gauge 369d shown in FIG. 4 are deleted. Therefore, the measurement module strain detection circuit 365 of this embodiment does not include the second detection circuit 373b.

The r output of the second detection circuit 373b detects the bending deformation y and the tensile deformation z as described in the first embodiment. These are deformations caused by the normal force R, and do not need to be detected when the normal force R is not calculated. Then, the equations (1), (2), (3), and (14) shown in the first embodiment are respectively changed to the following equations (15), (16), (17), and (18). In the present embodiment, as is apparent from the equations (15) to (17), the components of the matrix A can be calculated based on the first reference torsional torque P, the second reference torsional torque Q, and the t output and the k output in each of the first state and the second state.

[Math. 8]

$$\begin{pmatrix} t \\ k \end{pmatrix} = A \cdot \begin{pmatrix} T \\ K \end{pmatrix} = \begin{pmatrix} a & b \\ c & d \end{pmatrix} \begin{pmatrix} T \\ K \end{pmatrix} \quad (15)$$

[Math. 9]

$$\begin{pmatrix} tp \\ kp \end{pmatrix} = A \cdot \begin{pmatrix} W \\ P \end{pmatrix} \quad (16)$$

[Math. 10]

$$\begin{pmatrix} tq \\ kq \end{pmatrix} = A \cdot \begin{pmatrix} W \\ Q \end{pmatrix} \quad (17)$$

[Math. 11]

$$\begin{pmatrix} T \\ K \end{pmatrix} = A^{-1} \cdot \begin{pmatrix} t \\ k \end{pmatrix} \quad (18)$$

In the present embodiment, since the tangential force T and the torsional torque K are calculated, the matrix A has 2 rows and 2 columns, and the number of components decreases. The distance L from the central axis of the crank 105 to the center of the load applied to the pedal 103 by the cyclist is calculated by L(m)=K/T from the calculated tangential force T and the torsional torque K as in the first embodiment.

According to the present embodiment, since only the tangential force T and the torsional torque K are calculated, the number of strain gauges can be reduced. In addition, since the number of terms of the polynomials is reduced when the tangential force T and the torsional torque K are calculated, the calculation amount can be reduced.

Figure 15:
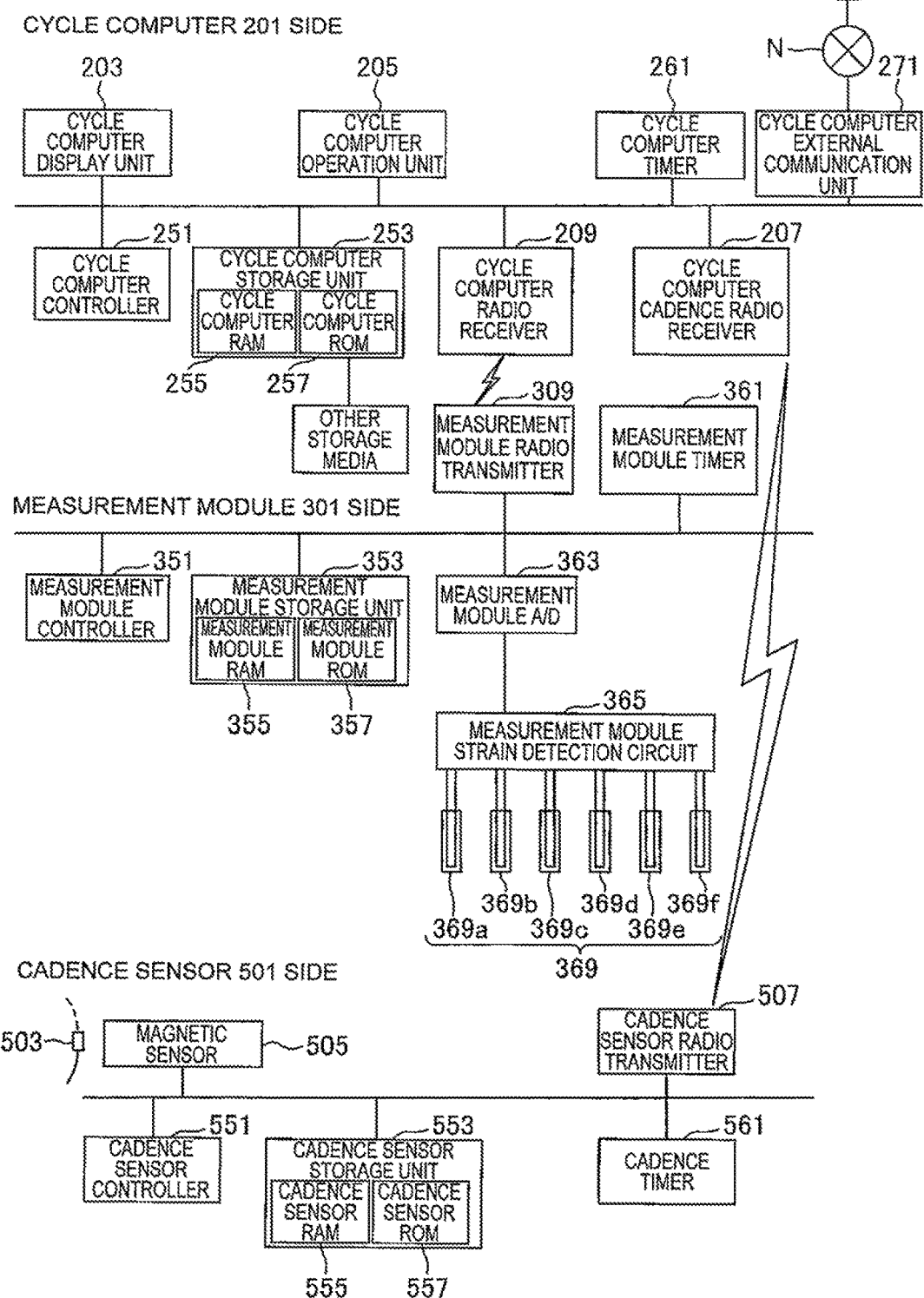
FIG. 15 is a block diagram of the cycle computer, the measurement module, and the cadence sensor according to another embodiment.

It should be noted that although in the above-described two embodiments, the cycle computer display unit 203 is described as an output unit, the output unit is not limited to a means for transmitting to the cyclist by display, voice, or the like. For example, as shown in FIG. 15, a cycle computer external communication unit 271 may be added to the cycle computer 201, and information such as the distance L from the central axis of the crank 105 to the center of the load applied to the pedal 103 by the cyclist may be output from the cycle computer external communication unit 271 to a server S connected through the public network N such as the Internet. In this case, the output unit is the cycle computer external communication unit 271. In addition, the information may be output directly from the measurement module 301 to the server S connected through the public network N.

In addition, although in the two embodiments described above, the strain gauge 369 is described as being provided near the center of the crank 105, the strain gauge 369 may be provided close to the pedal 103 or close to the crankshaft 107. When the strain gauge 369 is provided close to the pedal 103, since the strain amount of the crank 105 is small, the life of the strain gauge 369 can be prolonged. When the strain gauge 369 is provided close to the crankshaft 107, the output of the strain gauge 369 is increased by the principle of leverage and the influence of noise can be reduced.

In addition, although in the two embodiments described above, the information output device includes the cycle computer 201 and the measurement module 301, the information output device in the present invention may be a part of the cycle computer 201 or the measurement module 301, or may be another independent device. Furthermore, the information output device may be an aggregate of a plurality of physically separated devices. In some cases, the devices other than the strain gauge 369 (measurement module strain detection circuit 365) may be connected through communication and may be the devices in completely different places.

The human-powered machine in the present invention means a machine driven by the human power provided with the crank 105 of the bicycle 1, a fitness bike, and the like. That is, as long as it is a machine driven (not necessarily have to be the location movement) by human power provided with the crank 105, any type of human-powered machine will do.

In addition, the present invention is not limited to the above embodiments. That is, those skilled in the art can implement the present invention with various modifications without departing from the scope of the present invention according to the conventionally known knowledge. As long as these modifications still include the configuration of the information output device of the present invention, they are naturally included in the scope of the present invention.

REFERENCE SIGNS LIST 1 bicycle (human-powered machine)
103 pedal
105 crank
119 inner face (side face)
203 cycle computer display unit (output unit)
271 cycle computer external communication unit (output unit)
369a first strain gauge (strain detection unit, second strain gauge part)
369b second strain gauge (strain detection unit, second strain gauge part)
369c third strain gauge
369d fourth strain gauge
369e fifth strain gauge (strain detection unit, first strain gauge part)
369f sixth strain gauge (strain detection unit, first strain gauge part)
373a first detection circuit
373b second detection circuit
373c third detection circuit
C1 central axis
K torsional torque (torque acting in a direction causing torsion in crank)
L distance to the center of load applied to pedal (information on center position of load applied to pedal)
P first reference torsional torque
Q second reference torsional torque
T tangential force (force acting in the tangential direction of the circle defined by the rotational motion of the crank)
ST33 calculation of tangential force and distance to the center position of the load (calculation step)
ST73 display of data (output step)

The invention claimed is:

1. An information output apparatus comprising:
   a strain detection device provided on a side face of a crank in a human-powered machine, and configured to detect a strain occurring in the crank; and
   an output device configured to recognizably display a center position of a load applied to a pedal connected to the crank, based on a first force in a first direction that is on a circle defined by a rotational motion of the crank and a second force in a second direction causing torsion in the crank, the first force and the second force being calculated based on an output value of the strain detection device.

2. The apparatus according to claim 1,
   wherein the human-powered machine is a road bike.

3. The information output apparatus according to claim 1, wherein the human-powered machine is a stationary bike.

4. The apparatus according to claim 1, wherein the strain detection device is provided on a side face of cranks comprising each of the crank and another crank, which the human-powered machine includes in a grouping, and
   wherein the output device outputs the center position of the load applied to the pedal that is connected to each of the cranks so as to commonly display.

5. The apparatus according to claim 4, wherein the center position of the load applied to the pedal connected to each of the cranks is displayed relative to one another.

6. The apparatus according to claim 4,
   wherein the center position of the load applied to the pedal connected to the crank on one of a left side and a right side, and the other crank as the other of the left side and the right side, is displayed side by side.

7. The apparatus according to claim 1,
   wherein the output device outputs so as to commonly display the position of the load applied to the pedal, as detected by the strain detection device and a reference position.

8. The apparatus according to claim 1,
   wherein the output device is configured to output the center position of the load to include at least one of image information and numerical information.

9. The apparatus according to claim 1,
   wherein the strain detection device has a plurality of strain gauge parts including:
      a first strain gauge part configured to detect a strain deforming in the first direction in the crank; and
      a second strain gauge part configured to detect a strain deforming in the second direction.

10. The apparatus according to claim 9,
    wherein the first force in the first direction is acting in a first direction of the circle defined by rotational motion of the crank, and the second force in the second direction is torque,
    wherein each of the plurality of the strain gauge parts outputs respective voltage values based on a deformation amount of the crank in a direction in which each of the strain gauge parts detects the strain.

11. The apparatus according to claim 9,
    wherein the first force in the first direction of the circle defined by rotational motion of the crank and the torque acting in the second direction are each calculated by substituting the voltage value outputted from each of the plurality of strain gauge parts into respective polynomials.

12. The apparatus according to claim 11,
wherein a coefficient of each term of the respective polynomials is set in advance based on:
first reference torsional torque applied to the crank in a first state where a load is applied to a position on the pedal apart from a central axis of the crank by a first distance,
second reference torsional torque applied to the crank in a second state where the load is applied to a position on the pedal apart from a central axis of the crank by a second distance different from the first distance, and
the voltage value outputted from each of the plurality of strain gauge parts in each of the first state and the second state.

13. A non-transitory computer-readable medium including at least one processor and a storage that are configured to execute instructions, the instructions comprising:
receiving, on a side face of a crank in a human-powered machine, an output value based on information associated with a detected strain occurring in the crank; and
recognizably displaying a center position of a load applied to a pedal connected to the crank based on a first force in a first direction of a circle defined by a rotational motion of the crank and a second force in a second direction causing torsion in the crank, the first force and the second force being calculated based on the output value.

14. The non-transitory computer-readable medium of claim 13, the instructions further comprising:
providing a strain detection device on a side face of cranks comprising the crank and another crank, which the human-powered machine includes in a grouping, and
commonly displaying the center position of the load applied to the pedal that is connected to each of the cranks.

15. The non-transitory computer-readable medium of claim 14, the instructions further comprising displaying, in a side-by-side manner, the center position of the load applied to the pedal connected to the crank on one of a left side and a right side, and the other crank as the other of the left side and the right side.

16. The non-transitory computer-readable medium of claim 13, wherein the receiving further comprises:
detecting, via a strain detection device, the information associated with the detected strain, by,
first detecting, via a first strain gauge part, a strain deforming in the first direction in the crank, and
second detecting, via a second strain gauge part, a strain deforming in the second direction.

17. The non-transitory computer-readable medium of claim 16,
wherein the first force in the first direction is acting in a first direction of the circle defined by rotational motion of the crank, and the second force in the second direction is torque,
and wherein the instructions comprise determining the respective voltage values for each of the first strain gauge part and the second strain gauge part, based on a deformation amount of the crank associated with the first detecting and the second detecting.

18. The non-transitory computer-readable medium of claim 17, the instructions further comprising:
calculating the first force in the first direction of the circle defined by rotational motion of the crank and the torque acting in the second direction, by substituting the respective voltage values for each of the first strain gauge part and the second strain gauge part into respective polynomials.

19. The non-transitory computer-readable medium of claim 18, the instructions further comprising:
setting a coefficient of each term of the respective polynomials in advance, based on:
first reference torsional torque applied to the crank in a first state where a load is applied to a position on the pedal apart from a central axis of the crank by a first distance,
second reference torsional torque applied to the crank in a second state where the load is applied to a position on the pedal apart from a central axis of the crank by a second distance different from the first distance, and
the voltage value outputted from each of the plurality of strain gauge parts in each of the first state and the second state.

* * * * *